United States Patent
Nishijo et al.

(10) Patent No.: US 6,230,075 B1
(45) Date of Patent: May 8, 2001

(54) CONTROL DEVICE AND CONTROL METHOD OF LIBRARY APPARATUS, AND LIBRARY APPARATUS

(75) Inventors: Hiroaki Nishijo; Shinobu Sasaki, both of Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/539,873

(22) Filed: Mar. 31, 2000

Related U.S. Application Data

(62) Division of application No. 09/016,729, filed on Jan. 30, 1998.

(30) Foreign Application Priority Data

Jul. 3, 1997 (JP) .................................................. 9-178719

(51) Int. Cl.⁷ ...................................................... G06F 7/00
(52) U.S. Cl. ........................................ 700/214; 700/255
(58) Field of Search ................................. 700/214, 218, 700/255

(56) References Cited

U.S. PATENT DOCUMENTS

| | | | |
|---|---|---|---|
| 5,060,090 | 10/1991 | Kobayashi et al. | |
| 5,227,707 | 7/1993 | Mitomi et al. | 318/568.1 |
| 5,654,839 | 8/1997 | Tanaka et al. | 360/71 |
| 5,768,141 | 6/1998 | Hanaoka et al. | 364/478.02 |
| 5,867,388 | 2/1999 | Okumura et al. | 364/468.19 |
| 5,886,853 * | 3/1999 | Yoshida et al. | 360/98.05 |

FOREIGN PATENT DOCUMENTS 2-132672  5/1990  (JP) .

\* cited by examiner

*Primary Examiner*—Christopher P. Ellis
*Assistant Examiner*—Khoi H. Tran
(74) *Attorney, Agent, or Firm*—Staas & Halsey LLP

(57) ABSTRACT

A library apparatus of the present invention has directors which respectively determine operations of two carrying devices traveling along one traveling path. A servo control units move the carrying devices based on the determination of the directors. The serv control units obtain positional data of the carrying devices, and judge whether or not the carrying devices come into contact with each other by comparing these pieces of positional data. The servo control unit, when judging that the carrying devices come into contact with each other, stops a driving circuit of each carrying device. A drive of a motor for supplying each carrying device with power is thereby stopped, and the carrying device is stopped.

6 Claims, 16 Drawing Sheets

FIG. 7

| MONITORING TABLE | |
|---|---|
| ABSOLUTE POSITION OF SELF-SYSTEM ACCESSER | . . . . |
| MOVING DIRECTION OF SELF-SYSTEM ACCESSER | . . . . |
| MOVING VELOCITY OF SELF-SYSTEM ACCESSER | . . . . |
| OPERATION MODE OF SELF-SYSTEM ACCESSER | . . . . |
| TARGET POSITION OF SELF-SYSTEM ACCESSER | . . . . |
| ABSOLUTE POSITION OF OTHER-SYSTEM ACCESSER | . . . . |
| MOVING DIRECTION OF OTHER-SYSTEM ACCESSER | . . . . |
| MOVING VELOCITY OF OTHER-SYSTEM ACCESSER | . . . . |
| OPERATION MODE OF OTHER-SYSTEM ACCESSER | . . . . |
| TARGET POSITION OF OTHER-SYSTEM ACCESSER | . . . . |

~65a

FIG. 12
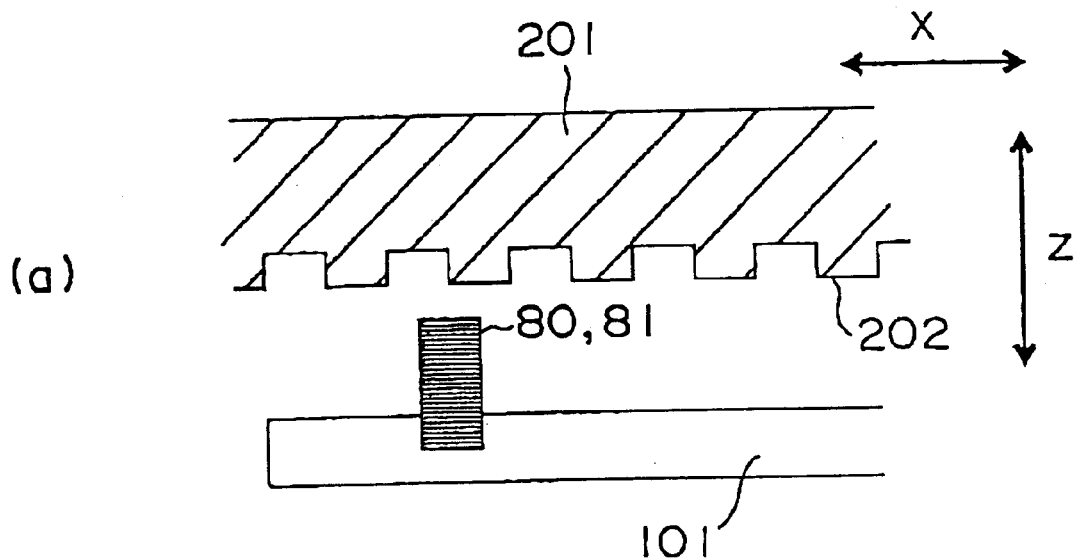
(a)
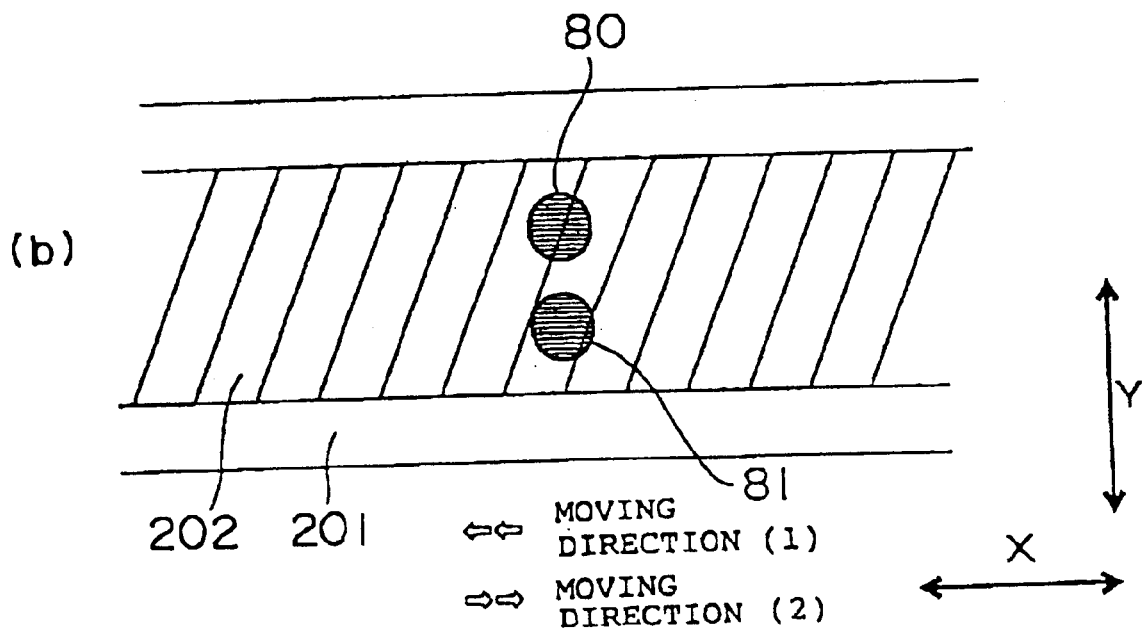
(b)
MOVING DIRECTION (1)
MOVING DIRECTION (2)

CONTROL DEVICE AND CONTROL METHOD OF LIBRARY APPARATUS, AND LIBRARY APPARATUS

This application is a divisional of application No. 09/016,729, filed Jan. 30, 1998, now allowed.

BACKGROUND OF THE INVENTION

The present invention relates to a library apparatus in which housing units of recording mediums are disposed on at least one side of one traveling path and a plurality of carrying devices for the recording mediums are disposed on the traveling path, and to a control device and a control method of the library apparatus.

In recent years, with a trend toward the multimedia of information, the data have been increasingly growing in quantity. Therefore, a huge quantity of data must be stored and managed in a computer system. There has been increased demands for middle- and large-sized library apparatuses as those for recording and reproducing the data at a high speed.

The middle- and large-sized library apparatus is roughly constructed in the manner which follows. To be specific, a plurality of box-shaped units are connected on both sides along one travelling path (a rail). A carrying device (referred to as an "accessor") for carrying a magnetic tape defined as a recording medium is installed on the traveling path. The plurality of units include a unit (a housing unit) for housing the magnetic tape, a unit (a recording/reproducing unit) for housing a recording/reproducing device of the magnetic tape, and a unit (a control unit) for housing a controller of the accessor. Then, the controller is connected to a host computer for issuing a variety of commands to the library apparatus.

A rocker constructed of a plurality of cells is formed on a surface, facing to the traveling path, of the housing unit, and the magnetic tape is housed in each cell. Further, a slot is formed in a surface, facing to the traveling path, of the recording/reproducing unit. When the magnetic tape-is inserted into the slot, the magnetic tape is loaded into the recording/reproducing device, and data is recorded on or reproduced from the magnetic tape.

Normally two accessors are provided on the traveling path in terms of a high-speed access being required of the middle- and large-sized library apparatus. Each of the accessor fetches the magnetic tape from an appropriate cell of the housing unit in accordance with a drive command generated by the controller, and performs an operation of carrying the magnetic tape to other cell or the recording/reproducing unit, or an operation of carrying again to an appropriate cell the magnetic tape on and from which the recording/reproducing processes have been done.

The control device housed in the control unit is constructed of control modules of two systems corresponding to the respective accessors. The control module comprises a director, an operation control processor of the accessor, a servo control processor, an accessor driving circuit and an accessor position detecting unit. Herein, the director receives a moving command of the magnetic tape from the host computer and also positional data of the accessor from the position detecting unit, and determines an operation of the accessor on the basis of the above command and data. The operation control processor gives the servo control processor an accessor moving command corresponding to the operation determined by the director. The servo control processor supplies the driving circuit with an accessor moving quantity based on the moving command. The driving circuit supplies an accessor actuator with a driving signal corresponding to the accessor moving quantity. The accessor actuator is thereby driven, and the accessor travels on the traveling path.

Further, the directors of the respective control modules are connected to each other, and the moving command of the magnetic tape and the accessor positional data are exchanged therebetween. Then, the respective directors structure an accessor moving sequence to optimize a moving efficiency of the accessors, and thus move the respective accessors (scheduling).

Particularly the middle- and large-sized library apparatus is required to have a large capacity and high-speed accessing, and therefore precise positional control and a high-speed operation are requested of the accessors. In order to satisfy these requests, the accessors are mounted with precision mechanisms. Consequently, a weight of the accessor amounts to approximately 45 kg under the actual condition. Further, accessor travels at a velocity as high as approximately 3.5 m/s in order to actualize the high-speed accessing, and therefore it might happen that the accessors collide with each other.

If the accessor collide with each other, a comparatively large impact is produced by the collision in terms of considering the weights and the traveling speed thereof. Hence, the precision mechanisms of the accessors are damaged, and an error in accuracy occurs, resulting in such a state that both of the accessors might become unusable. The library apparatus is constructed such that all the cartridges can be, even if the accessor of one system becomes unusable due to the collision etc, continuously carried by the remaining accessor of the other system in order to ensure a high reliability when in operation. If the accessors of the two systems fall into the unusable state because of the collision etc, however, the continuance of the carrying operation thereafter becomes impossible. Moreover, the accessor has the precision mechanism and is therefore expensive. If the accessor is damaged, a considerable economical burden is needed for repairing the damaged accessor.

Furthermore, if the accessors collide with each other, the magnetic tape carried by the accessor might be also damaged due to the impact thereof. This damage to the magnetic tape conduces directly to a loss of data, i.e., the greatest fault in the computer system using the library apparatus.

Thus, the damages caused by the collision between the accessors might become tremendous, and it is therefore required that the collision between the accessors be avoided as much as possible in the middle-and large-sized library apparatus.

SUMMARY OF THE INVENTION

It is a primary object of the present invention, which was contrived in view of the problems given above, to provide a control device and a control method of a library apparatus that are capable of controlling a plurality of carrying devices efficiently and safely, and the library apparatus as well.

According to a first aspect of the present invention, there is provided a control device of a library apparatus having one traveling path along which a plurality of housing units for housing recording mediums are disposed at least one side thereof, a plurality of carrying devices for carrying the recording medium between the housing units by moving on the traveling path; and a determining device for determining an operation of each of the carrying devices so that the carrying devices do not collide with each other. This control device comprises a movement controlling device for controlling respective movements of the plurality of carrying devices on the basis of a result of the determination made by the determining device, a monitoring device for obtaining respective positions of the plurality of carrying devices, and judging whether or not the carrying devices come into contact with each other by comparing the obtained positions of the carrying devices, and a stopping device for stopping at least one of the two carrying devices so judged by the monitoring device as to come into contact with each other.

According to the first aspect of the invention, the determining device determines the operation of each of the plurality of carrying devices moving along the single traveling path. Subsequently, the movement controlling device moves each of the carrying devices. At this time the monitoring device obtains positions of the respective carrying devices, and judges whether or not any two of the plurality of carrying devices come into contact with each other by comparing the positions thereof. Then, when judging that the carrying devices come into contact with each other, the stopping device stops at least one of the two carrying devices. It is thereby feasible to prevent the collision between the carrying devices and the damages to the carrying devices and the recording mediums. Further, it is feasible to prevent the collision between the carrying devices, when a unusual traveling of a carrying device occurred by a breakdown of traveling mechanism of the carrying device.

Herein, the number of the housing units and the number of the carrying devices are not specified. Further, in addition to the housing units, there may be disposed recording/reproducing units housing the recording/reproducing devices for recording and reproducing the data on and from the recording mediums. Moreover, the determining device and the movement controlling device may be constructed of, e.g., the recording mediums recorded with programs and processor devices for executing the programs. Further, the position of each of the carrying devices may be a present position of the carrying device or an end-of-movement position of each carrying device.

According to the first aspect described above, it is desired that the control device further comprises a restarting device for restarting the carrying devices stopped by the stopping device, a start judging device for judging whether or not the carrying devices are restarted by the restarting device, a retreating device for, if the start judging device judges that any one of the carrying devices is not restarted, making the non-restarted carrying device retreat up to a position enough not to collide with the other carrying device, and a reexecuting device for supplying a drive signal for making the carrying devices execute the operation conducted when stopped by the stopping device, to each of the carrying devices restarted by the restarting device. In this case, the carrying device stopped by the stopping device automatically resumes the operation, and therefore the resumption of the operation does not depend on human hands.

Further, according to the first aspect of the invention, the control device may further comprise a second stopping device for monitoring an operation of the movement controlling device and, if the operation of the movement controlling device is abnormal, stopping any one of the plurality of carrying devices. If constructed in this way, it is feasible to prevent the collision between the carrying devices, which is derived from an abnormality in the movement controlling device.

Moreover, according to the first aspect of the invention, it is desirable that the control device further comprises a second monitoring device for detecting positions of the respective carrying devices separately from the monitoring device, comparing a result of this detecting with the positions of the respective carrying devices which positions are obtained by the monitoring device, and stopping the operations of the carrying devices falling into non-coincidence in the comparison therebetween. In this case, it is possible to prevent the collision between the carrying devices, which is caused by an occurrence of error in the carrying device position obtained by the monitoring device due to the fault in the monitoring device.

Moreover, according to the first aspect of the invention, the monitoring device may be so constructed as to further obtain moving directions of the carrying devices, and judge based on these moving directions and the positions of the carrying devices whether or not the carrying devices come into contact with each other. Further, the monitoring device may be so constructed as to further obtain the moving velocities of the respective carrying devices, and judge whether or not the carrying devices come into contact with each other on the basis of these moving velocities, the moving directions and the positions of the respective carrying devices. Additionally, the monitoring device may be so constructed as to further obtain a status of executing the operation of each carrying device, and judge whether or not the carrying devices come into contact with each other on the basis of the statuses of executing the operations thereof, the moving velocities, the moving directions and the positions of the carrying devices. Herein, the statuses of executing the operations may be a status in which the carrying device is in process of traveling, a statue in which the carrying device is in process of damping, and a status in which the carrying device remains stopped.

Further, according to the first aspect of the invention, the monitoring device includes a position detecting device for detecting present positions of the carrying devices. The control device may further comprise a second position detecting device for detecting the present positions of the carrying devices separately from the position detecting device, and a third stopping device for comparing a result of the detection by the position detecting device with a result of the detection by the second position detecting device, and stopping the operations of the carrying devices falling into non-coincidence in the comparison therebetween.

A second aspect of the present invention, there is provided a control method of a library apparatus having one traveling path along which a plurality of housing units for housing recording mediums are disposed at least one side thereof, a plurality of carrying devices for carrying the recording medium between the housing units by moving on the traveling path, and a determining device for determining an operation of each of the carrying devices so that the carrying devices do not collide with each other. This control method comprises a first step of making each of said carrying devices move on the basis of a result of the determination made by the determining device, a second step of obtaining respective positions of the plurality of carrying devices, and judging whether or not the carrying devices come into contact with each other by comparing the obtained positions of the carrying devices, and a third step of stopping at least one of the two carrying devices so judged as to come into contact with each other.

According to a third aspect of the present invention, a library apparatus comprises one traveling path along which a plurality of housing units for housing recording mediums are disposed at least one side thereof, a plurality of carrying devices for carrying the recording medium between the housing units by moving on the traveling path, a determining device for determining an operation of each of the carrying devices, a movement controlling device for respectively moving the plurality of carrying devices on the basis of a result of the determination made by the determining device, a monitoring device for obtaining respective positions of the plurality of carrying devices, and judging whether or not the carrying devices come into contact with each other by comparing the positions of the carrying devices, and a stopping device for stopping at least one of the two carrying devices so judged by the monitoring device as to come into contact with each other.

According to a fourth aspect of the present invention, there is provided a control device of a library apparatus having one traveling path along which a plurality of housing units for housing recording mediums are disposed at least one side thereof, a plurality of carrying devices, each moving on the traveling path, for carrying the recording medium between the housing units, and a determining device for determining an operation of each of the carrying devices so that the carrying devices do not collide with each other. This control device comprises a movement controlling device, provided corresponding to one of the plurality of carrying devices, for moving one carrying device on the basis of a result of the determination made by the determining device, a first position detecting device for detecting a moving quantity when one carrying device is moved by the movement controlling device, a second position detecting device for detecting the moving quantity of one carrying device separately from the first position detection device when the moving quantity of one carrying device is detected by the first position detecting device, and a stopping device for comparing a result of the detection by the first position detecting means with a result of the detection by the second position detecting device and, if the two results are not coincident with each other, stopping the movement of one carrying device.

According to the fourth aspect of the invention, the first position detecting device and the second position detecting device further respectively detect moving directions of one carrying device. The stopping device stops one carrying device if the moving direction detected by the first position detecting device is not coincident with the moving direction detected by the second position detecting device.

Further, according to the fourth aspect of the invention, the traveling path is formed with a rack having a plurality of gear teeth provided in the moving direction of each of the carrying devices. Each of the carrying devices has a pinion rotating while meshing gear teeth of the rack. The movement controlling device includes a motor for giving a rotating force to the pinion, and a driving circuit for supplying electric power to the motor. The first position detecting device is constructed of a tachometer for detecting a quantity of rotations of the motor for rotating the pinion provided in one carrying device, and a first calculating unit for calculating a moving quantity of one carrying device on the basis of an output signal of the tachometer. The second position detecting device is constructed preferably of a sensor, provided on one carrying device in such a state as to be movable on a straight line in a face-to-face relationship with the rack, for detecting the gear teeth of the rack bearing such a positional relationship as to face to the sensor itself, and a second calculating unit for calculating the moving quantity from the number of gear teeth of the rack that are detected by the sensor.

In this case, it is desirable that the stopping device be so constructed as to cut off the electric power given to the motor from the driving circuit, and abruptly damp one carrying device by short-circuiting between terminals of the motor.

Further, it is also desirable that the sensor comprises a first sensor and a second sensor that are disposed with a deviation in relative positions with respect to the gear teeth of the rack in the moving direction along the traveling path of one carrying device.

According to a fifth aspect of the present invention, a library apparatus comprises one traveling path along which a plurality of housing units for housing recording mediums are disposed at least one side thereof, a plurality of carrying devices, each moving on the traveling path, for carrying the recording medium between the housing units, a determining device for determining an operation of each of the carrying devices so that the carrying devices do not collide with each other, a movement controlling device, provided corresponding to one of the plurality of carrying devices, for moving one carrying device on the basis of a result of the determination made by the determining device, a first position detecting device for detecting a moving quantity when one carrying device is moved by the movement controlling device, a second position detecting device for detecting the moving quantity of one carrying device separately from the first position detection device when the moving quantity of one carrying device is detected by the first position detecting device, and a stopping device for comparing a result of the detection by the first position detecting device with a result of the detection by the second position detecting device and, if the two results are not coincident with each other, stopping the movement of one carrying device.

According to the control device and the control method of the library apparatus, and the library apparatus of the present invention, the plurality of carrying devices can be controlled safely at the high efficiency. Accordingly, it is feasible to prevent the damages to the carrying devices and the recording mediums due to the collisions between the carrying devices. Further, the present invention is avoidable a collision between two carrying devices in spite of a breakdown of a traveling mechanism of a carrying device. Further, if the carrying device urgently stops, the operation can be resumed without depending on the human hands.

Note that according to the present invention, the following items can be further disclosed.

(1) A control device of a library apparatus according to claim 1, wherein the moving controlling device is constructed of a power supplying device for supplying the respective carrying devices with power, a command issuing device for issuing a drive command of the power supplying device in accordance with the operation of each of the carrying devices that is determined by the determining device, and a driving device for driving the power supplying device in accordance with the drive command issued by the command issuing device, the monitoring device is constructed of a position detecting device for detecting the present position of each of the carrying devices, a calculating device for calculating a moving direction of each of the carrying devices and a moving velocity of each of the carrying devices on the basis of the detected present position of each of the carrying devices, and a judging device for judging whether or not the carrying devices come into contact with each other by reading a content of storage in the storing means, and the stopping device, when the judging device judges that the carrying devices are brought into contact with each other, stops the operation of the power supplying device by giving a drive stop command to the driving device.

(2) A control device of a library apparatus according to claim 1, wherein the monitoring device is constructed of a plurality of monitoring units provided corresponding to the plurality of carrying devices, and any one of the plurality of monitoring units obtains a position of the carrying device from other monitoring unit, and judges whether or not the carrying devices come into contact with each other by comparing the obtained position with a carrying device position possessed by the monitoring unit itself.

(3) A control device of a library apparatus according to claim 9, wherein the stopping device, when stopping the movement of one carrying device described above, also stops the movement of the other carrying device.

(4) A control device of a library apparatus according to claim 9, wherein the movement controlling device is constructed of a power supplying device for supplying one carrying device with the power, a command issuing device for issuing a drive command of the power supplying device that corresponds to the operation of one carrying device which is determined by the determining device, and a driving device for driving the power supplying device in accordance with the drive command issued by the command issuing device, the first position detecting device detects a moving quantity of one carrying device on the basis of the drive quantity of the power supplying device, and the second position detecting means detects the moving quantity of one carrying device on the basis of a relative position of the device itself with respect to the traveling path.

(5) There is provided a control method of a library apparatus having one traveling path along which a plurality of housing units for housing recording mediums are disposed at least one side thereof, a plurality of carrying devices, each moving on the traveling path, for carrying the recording medium between the housing units, and a determining device for determining an operation of each of the carrying devices so that the carrying devices do not collide with each other. This control method comprises a first step of respectively moving one of the plurality of carrying devices on the basis of a result of the determination made by the determining device, a second step of detecting a moving quantity when one carrying device moves; a third step of detecting the moving quantity of one carrying device separately from the second step when the moving quantity of one carrying device is detected in the second step, and a fourth step of stopping the movement of one carrying device if a result of the detection in the second step is not coincident with a result of the detection in the third step when in comparison therebetween.

BRIEF DESCRIPTION OF THE DRAWINGS

Other objects and advantages of the present invention will become apparent during the following discussion in conjunction with the accompanying drawings, in which:

FIG. 7 is an explanatory chart showing a monitoring table shown in FIG. 6;

FIG. 12 is an explanatory view showing a rack and a sensor shown in FIG. 11;

DETAILED DESCRIPTION OF THE PREFERRED EMBODIMENTS

Preferred embodiments of the present invention will hereinafter be described with reference to the accompanying drawings.

Embodiment 1

To begin with, a library apparatus in accordance with an embodiment 1 of the present invention will hereinafter be described.

Mechanical Construction of Library Apparatus

Figure 1:
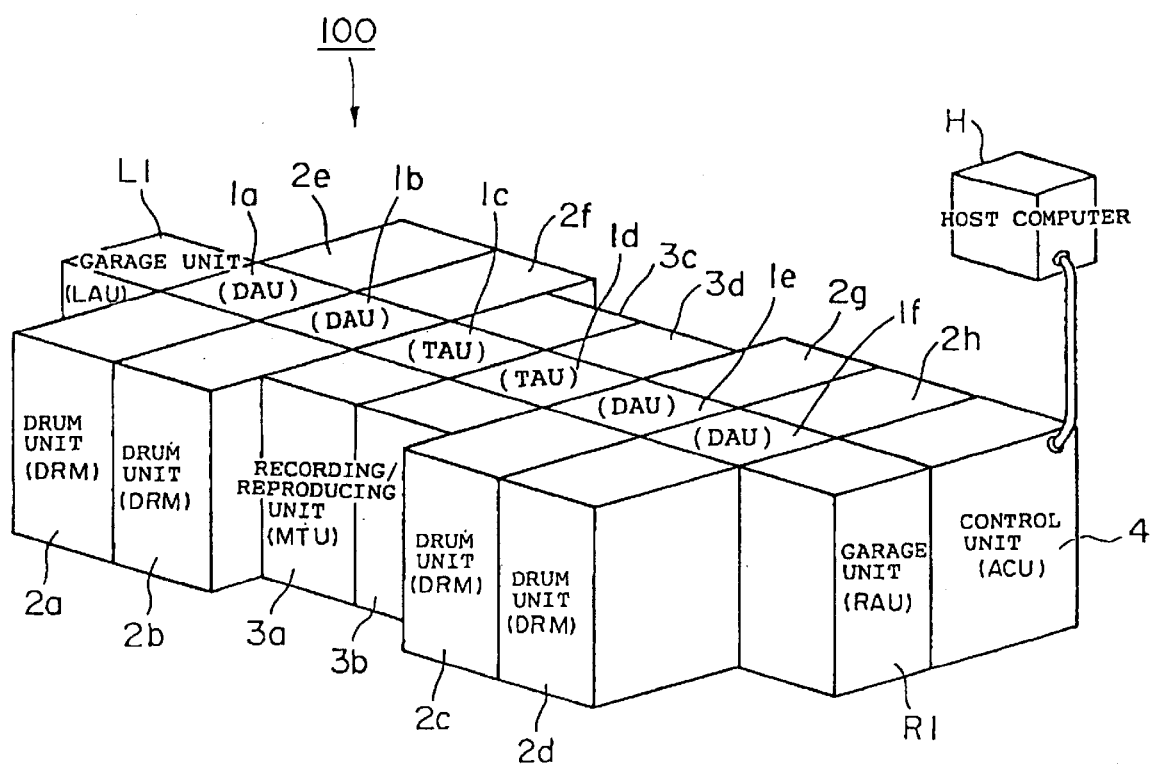
FIG. 1 is a view illustrating an external configuration of a library apparatus.

To start with, a mechanical construction of a library apparatus 100 in accordance with the present embodiment will be described. FIG. 1 is a view illustrating a configuration of an external appearance of the library apparatus 100 in this embodiment. Referring to FIG. 1, the library apparatus 100 is classified as a middle/large-sized library apparatus and is constructed of a plurality of box-shaped units connected to each other.

To be specific, the library apparatus 100 comprises a passageway units 1a–1f arranged on the same straight line and connected to each other, garage units L1 (LAU: Left Accesser Unit) and R1 (RAU: Right Accesser Unit) connected respectively to edge portions of the passageway units 1a–1f, drum units (DRM: Drum unit) 2a–2d connected respectively to one side edges (substantially left edges in FIG. 1) of the passageway units 1a–1f, recording/reproducing units (MTU: Magnetic Tape Unit) 3a, 3b connected likewise to the one side edges thereof, drum units 2e–2h connected respectively to the other side edges (substantially right edges in FIG. 1) of the passageway units 1a–1f, recording/reproducing units 3c, 3d connected likewise to the other side edges thereof, and a control unit (ACU: Accessor Control Unit) 4 connected to the garage unit R1 and the drum unit 2h. Then, a host computer H is connected via a communication line to the control unit 4.

Figure 2:
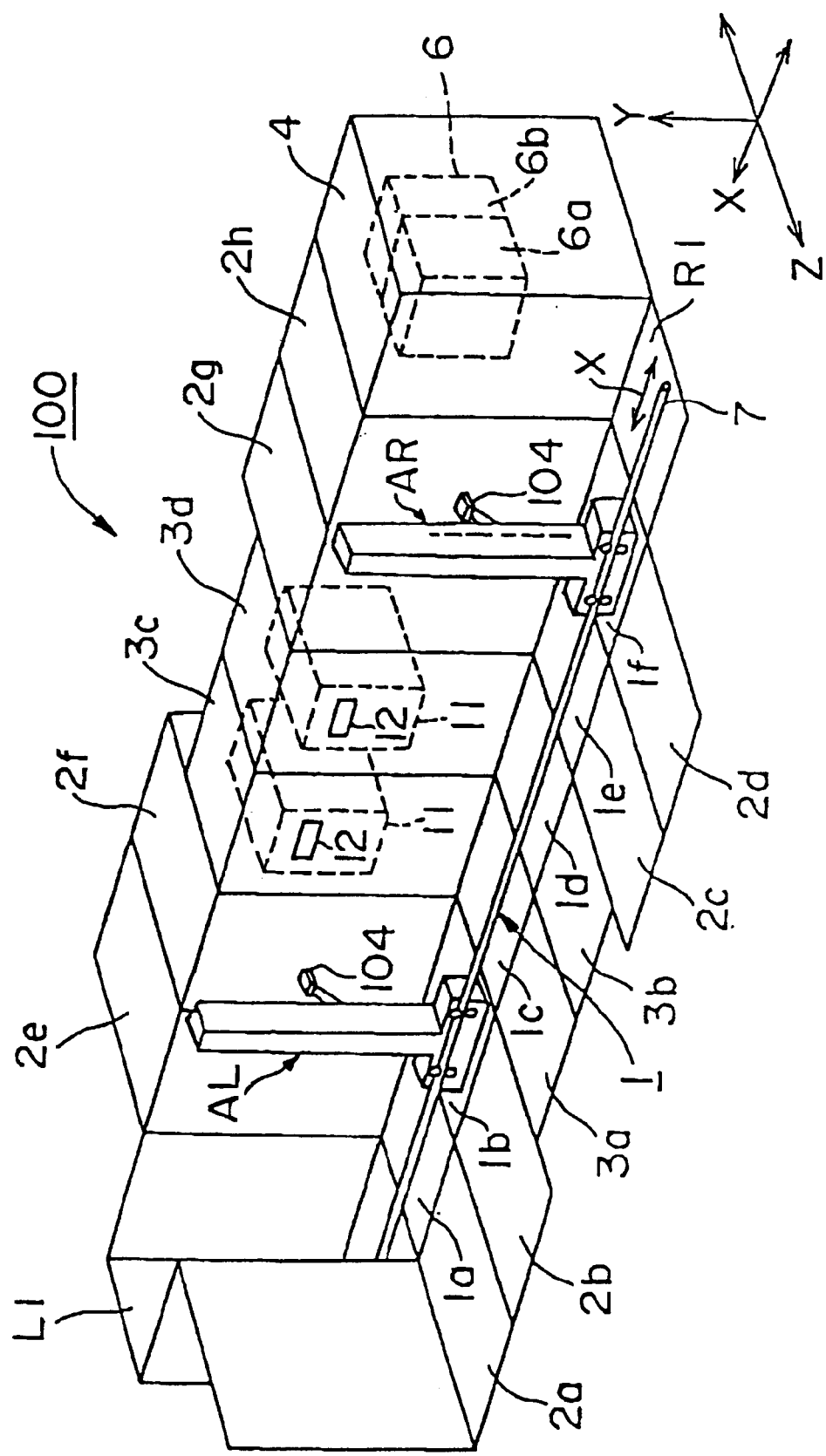
FIG. 2 is an explanatory view showing an interior of the library apparatus shown in FIG. 1.

FIG. 2 is a partial perspective view of the library apparatus 100 illustrated in FIG. 1. Referring to FIG. 2, each of the passageway units 1a–1f has a hollow interior excluding bottom and top plates. One internal space communicating with the passageway units 1a–1f is therefore formed. This internal space is formed with a passageway 1 for two accessers AL and AR defined as carrier devices of a magnetic tape (corresponding to a recording medium).

The garage unit L1 is connected to the passageway unit 1a and functions as a housing unit for the accesser AL. Further, the garage unit R1 is connected to the passageway unit if and functions as a housing unit for the accesser AR. Each of the garage units L1, R1 has an hollow interior, and these internal spaces communicate with the internal space serving as the passageway 1 within the passageway units 1a–1f.

Herein, in this embodiment, a position of the accesser AL when housed in the garage unit L1 is set as an initial position (a home position) of the accesser AL. A position of the accesser AR when housed in the garage unit R1 is set as an initial position (a home position) of the accesser AR.

Figure 3:
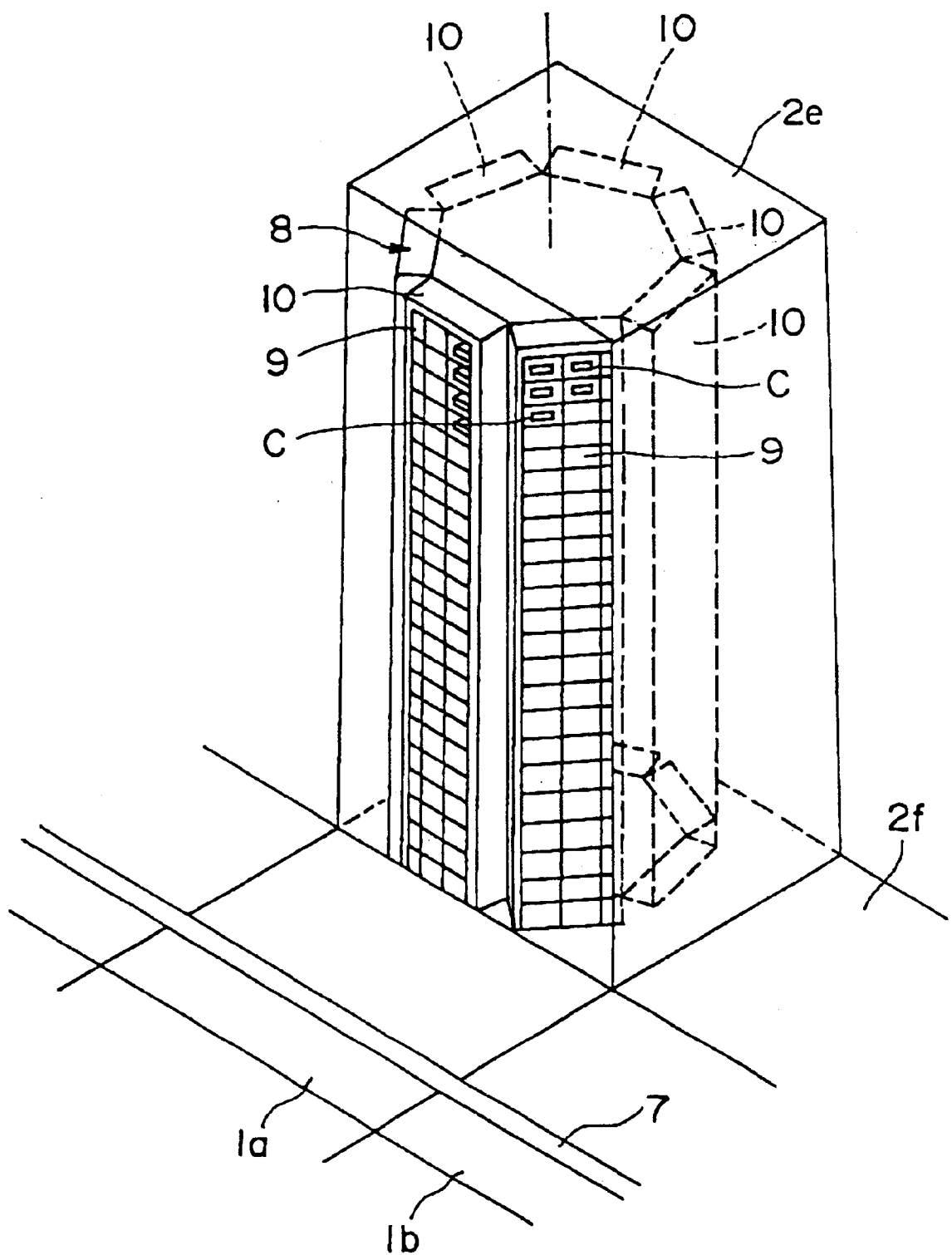
FIG. 3 is a view showing a construction of a drum unit shown in FIG. 1.

Each of the drum units 2a–2h (corresponding to housing units) houses a multiplicity of magnetic tapes. FIG. 3 is a schematic view showing an example of an internal structure of each of the drum units 2a–2h. Each of the drum units 2a–2h in this embodiment has the same construction. Therefore, the drum unit 2e will be exemplified.

Referring to FIG. 3, the drum unit 2e does not have a partition wall directed to the passage unit 1a, and its internal space communicates with the internal space of the passageway units 1a–1f as well as with internal spaces of the garage units L1, R1. The drum unit 2e houses a drum 8 taking a substantially septenary prismatic shape.

The drum 8 is disposed with its central axis directed in a perpendicular direction and is rotatable about this central axis serving as a rotary axis. A rocker 10 consisting of cells 9 arrayed in a plurality of rows and in a plurality of columns is formed on each side surface of the drum 8. A cartridge C loaded with the magnetic tape is housed in each cell 9. The drum 8 stops rotating in a state where a front surface of any one of the rockers 10 is directed to the passageway unit la, and the front surface of this rocker 10 is exposed to the internal space forming the passageway 1. The rocker 10 facing to this passageway unit 1a is properly changed with a rotation of the drum 8.

As illustrated in FIG. 2, each of the recording/reproducing units 3a–3d houses a recording/reproducing device 11 of the magnetic tape. A slot 12 for inserting or ejecting the cartridge C is formed in a passageway-sided partition wall, facing to the passageway 1, of each of the recording/reproducing units 3a–3d. When the cartridge C is inserted into the slot 12, the cartridge C is loaded into the recording/reproducing device 11. The recording/reproducing device 11, when loaded with the cartridge C, records or reproduces data on or from the magnetic tape set in the cartridge C. Then, upon finishing the record or reproduction of the data, the recording/reproducing device 9 ejects the cartridge C into a state where the cartridge C springs halfway out of the slot 12.

A single rectilinear guide rail 7 (corresponding to a traveling path) is extended along an X-axis disposed within the horizontal plane over to the garage unit R1 from the garage unit L1 through the interiors of the garage units L1, R1 and the passageway units 1a–1f. The accessers AL and AR are attached to this guide rail 7. The accessers AL and AR are capable of traveling in the direction (a direction X in FIG. 2) along the guide rail 7.

Figure 4:
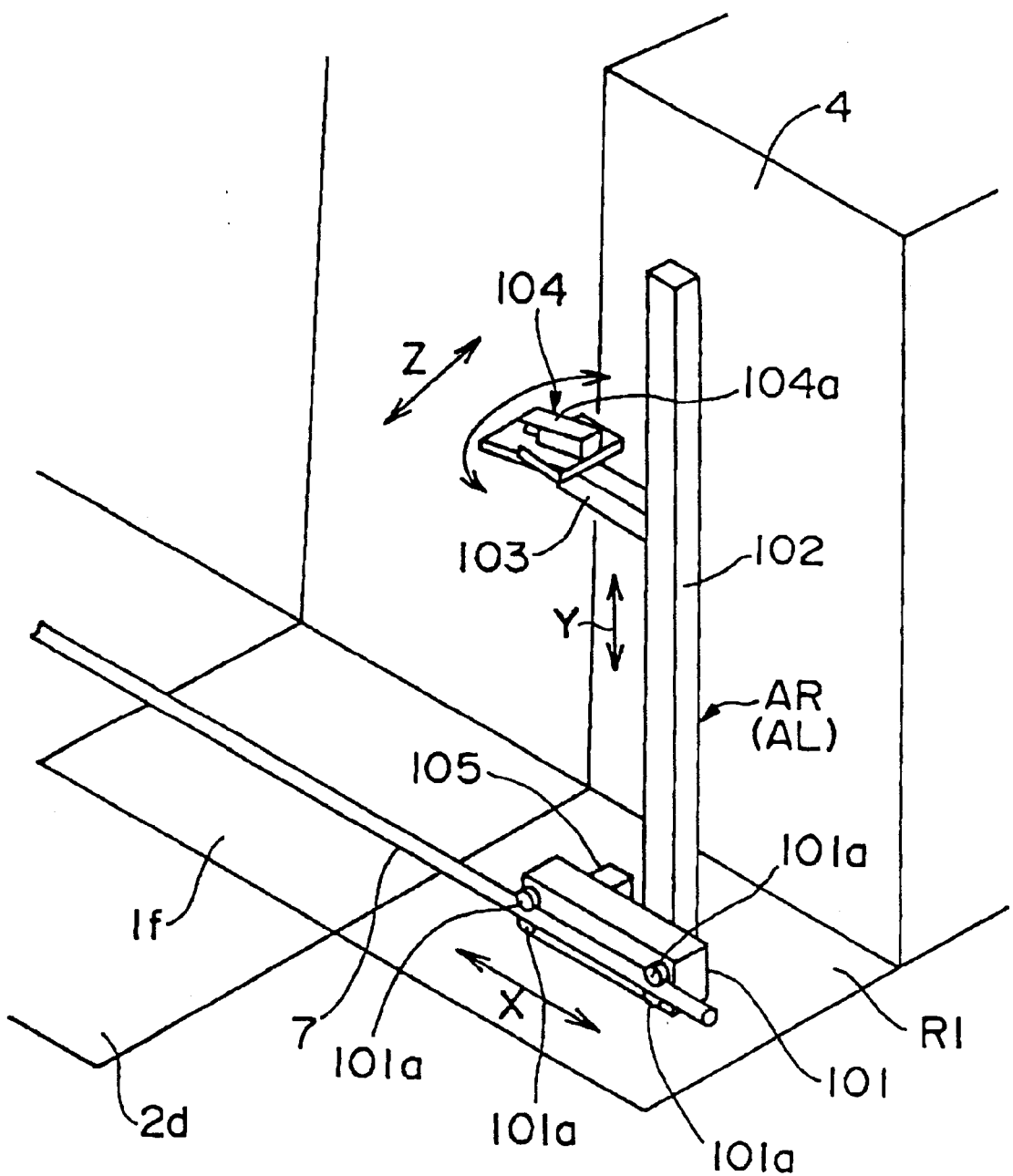
FIG. 4 is a view illustrating a construction of an accessor shown in FIG. 2.

FIG. 4 is a schematic view illustrating a construction of the accesser AL or AR. The accessers AL and AR have the same construction, and hence the accesser AR is herein exemplified. Referring to FIG. 4, the accesser AR comprises a traveling member 101, a support 102, and arm 103 and a picker 104 of the cartridge C. The traveling member 101 has two pairs of rollers 101a disposed in a face-to-face relationship with the drum units 2a–2d and the recording/reproducing units 3a, 3b. Each pair of rollers 101a seizes the guide rail 7 in the perpendicular direction, thereby securing the traveling member 101 to the guide rail 7. Then, the respective rollers 101a rotate, whereby the accesser AR moves along the guide rail 7.

Herein, the accesser AL is, when the accesser AR is housed in the garage unit R1, movable to the fronts of the drum units 2d, 2h from the garage unit L1. On the other hand, the accesser AR is, when the accesser AL is housed in the garage unit L1, movable to the fronts of the drum units 2a, 2e from the garage unit R1.

Further, the support 102 is formed integrally with the traveling member 101, and a central axis of the support 102 is disposed in the perpendicular direction (a direction Y in FIG. 4). The arm 103 extends in the horizontal direction from the side surface of the support 102, and the picker is attached to a terminal of the arm 103.

The arm 103 moves in the direction Y with the aid of a column 102a formed on the support 102. Further, the arm 103 rotates through 180° within the X-Z plane from a state where the picker 104 faces to one side surface of the passageway 1 to a state where the picker 104 faces to the side surface thereof. The direction Z is herein a direction along a Z-axis orthogonal to the X- and Y-axes, and the X-Z plane is a horizontal plane containing the X- and Z-axes. The picker 104 thereby becomes possible of facing to all of the drum units 2a–2h and the recording/reproducing units 3a–3d. The picker 104 has a hand 104a for grasping the cartridge C. The hand 104a is movable to and fro in the direction Z in FIG. 4.

With the construction described above, the accesser AR is capable of carrying all the cartridges C housed in the drum units 2a–2h or the recording/reproducing units 3a–3d.

The accessers AL and AR operate in accordance with a command given from the host computer H. For example, when the host computer H issues a command purporting that recording/reproducing processes be executed by the accesser AR with respect to a specified cartridge C, the accesser AR operates as follows.

At the first onset, the accesser AR travels in the direction X to a position in front of a predetermined drum unit (e.g., the drum unit 2d) accommodating the specified cartridge C. Subsequently, the arm 103 of the accesser AR rotates within the X-Z plane so that the picker 104 faces to the rocker 10 housing the specified cartridge C. Subsequently, the arm 103 moves in the direction Y so that the picker 104 is positioned in front of the cell 9 housing the specified cartridge C. Subsequent to this operation, the hand 104a of the picker 104 moves forward into the cell 9 and catches the specified cartridge C and moves back to the previous position.

Subsequently, the accesser AR travels in the direction X to a position in front of a predetermined recording/reproducing unit (e.g., the recording/reproducing unit 3d). Subsequently, the arm 103 rotates within the X-Z plane so that the picker 104 faces to the recording/reproducing unit 3d. Then, the arm 103 moves in the direction Y so that the picker 104 is positioned in front of the slot 12 of the recording/reproducing unit 3d. Subsequently, the hand 104a moves forward to the slot 12, inserts the specified cartridge C into the slot 12, and releases the same cartridge C therein. Finally, the hand 104a moves back to the previous position.

Note that the respective accessors AL, AR are attached with, though not illustrated, a Z-motor for rotating the arm 103 within the X-Z plane, a Y-motor for moving the arm 104 in the Y-direction, and an actuator for enabling the hand 104a to make accessing/separating motions and grasping/releasing motions. These motors are properly actuated, whereby the accessors AL, AR perform an operation of fetching the cartridge C out of the cell 9 and the slot 12, or an operation of inserting the cartridge C into the cell 9 and the slot 12.

Construction of Control Device in Library Apparatus

Next, a control device of the library apparatus 100 will be explained. As shown in FIG. 2, a control device 6 of each of the accessors AL, AR is housed in the control unit 4. This control device 6 is constructed of two-system control modules, i.e., an L-system control module 6a for controlling the accessor AL, and an R-system control module 6b for controlling the accessor AR. Thus, the accessors AL, AR are controlled by the separate control modules, and hence the library apparatus 100 remains operable even if one of the accessors AL and AR becomes unusable.

Figure 5:
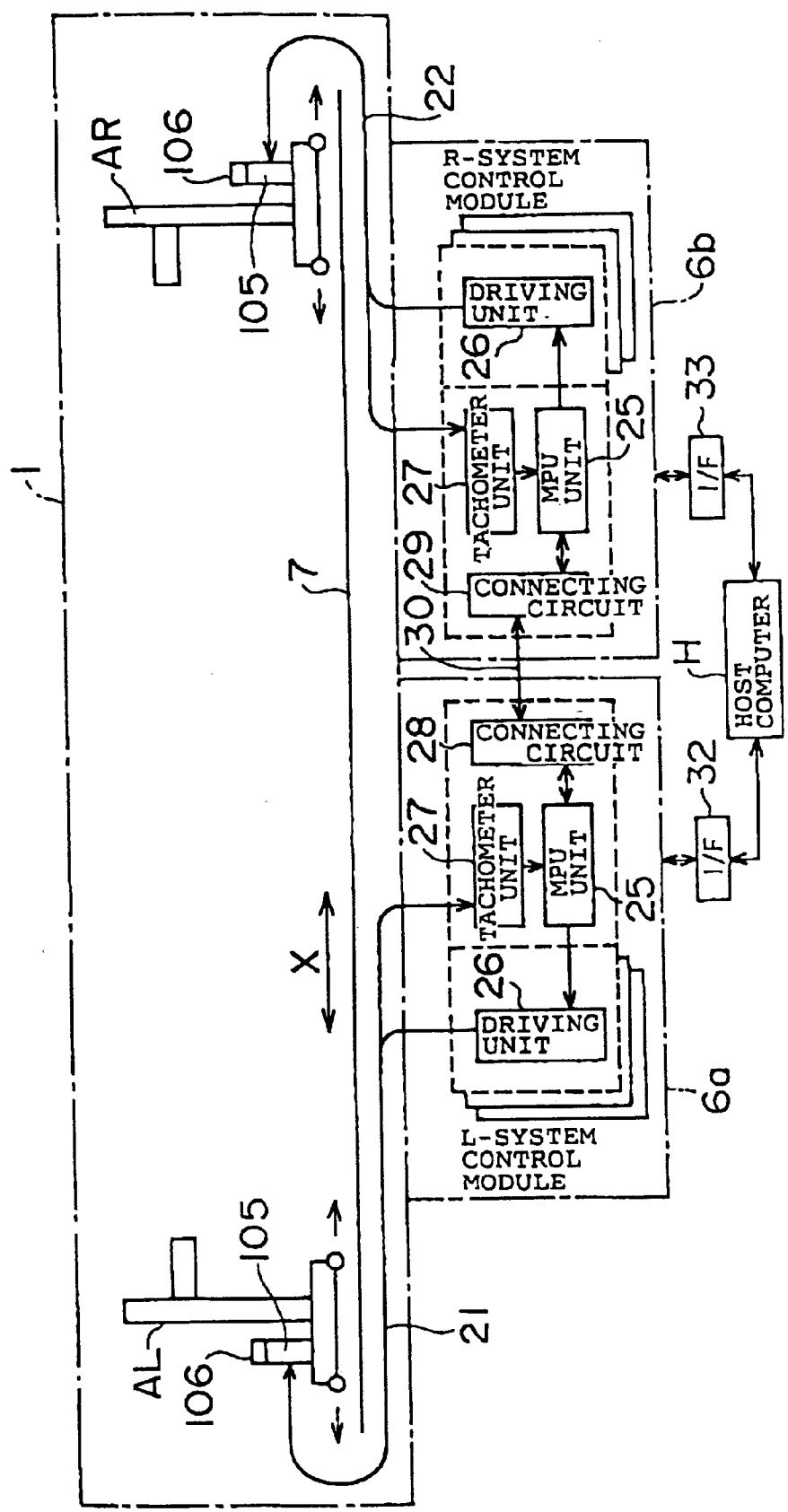
FIG. 5 is an explanatory view of a control device shown in FIG. 2.

FIG. 5 is a diagram showing a state of how the control device 6 is connected to the respective accessors AL, AR. Referring to FIG. 5, the L-system control module 6a is connected to the X-motor 105 of the accessor AL via a cable 21 for supplying electric power. On the other hand, the R-system control module 6b is connected to the X-motor of the accessor AR via an electric power supply cable 22.

These L- and R-system control modules 6a, 6b have absolutely the same construction. That is, each of the L- and R-system control modules 6a, 6b includes an MPU (Micro Processing Unit) 25, a driving unit 26, a tachometer unit 27 and a connection circuit (an interface) 28, which are connected via signal lines. Then, the connection circuit 28 of the L-system control module 6a is connected via a communication cable 30 to the interface 28 of the R-system control module 6b. Further, the L- and R-system control modules 6a, 6b are respectively connected to the host computer H through interfaces 32, 33.

Further, though not illustrated, each of the L-and R-system control modules 6a, 6b includes a processor device for controlling drives of the unillustrated Y-motor, the unillustrated Z-motor and an unillustrated actuator, and a driving circuit for driving these motors. Then, the process of driving the Y-motor, the Z-motor and the actuator is controlled by those unillustrated processor device and driving circuit simultaneously with or subsequently to the drive control of the X-motor 105.

Operation Control of Accessor

Figure 6:
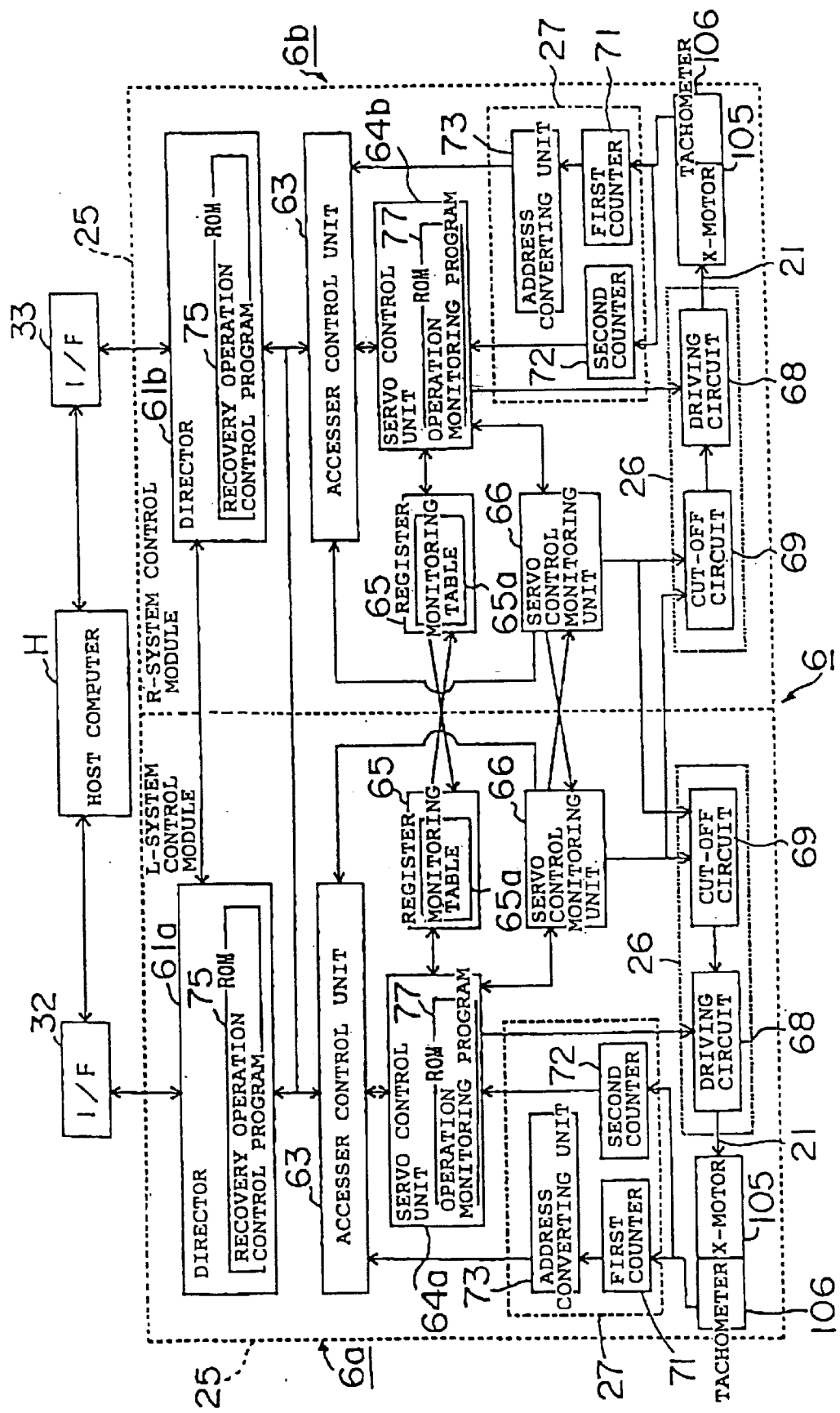
FIG. 6 is an explanatory diagram showing details of the control device shown in FIG. 5.

Next, a construction for controlling the operations of the accessors AL, AR will be explained. FIG. 6 is a block diagram showing details of the control device 6 illustrated in FIG. 5. Referring to FIG. 6, however, there are omitted the connection circuit 28 and the communication cable 30 that are shown in FIG. 5, and only a flow of data transmitted between the L- and R-system control modules 6a, 6b, is shown. Further, as described above, since the L- and R-system control modules 6a, 6b have absolutely the same construction, the L-system control module 6a is herein described by way of an example, and the R-system control module 6b is explained as the necessity may arise.

Referring to FIG. 6, the MPU 25 of the L-system control module 6a comprises a director 61a, an accessor control unit 63, a servo control unit 64a, a register 65 and a servo control monitoring unit 66, which are connected to each other via a bus. Further, the driving unit 26 is constructed of a driving circuit 68 connected via the cable 21 to the X-motor 105, and a cut-off circuit 69 connected to this driving circuit 68. Then, the tachometer unit 27 is constructed of a tachometer circuit 106 attached to the X-motor 105, first and second counters 71, 72 connected via a signal line to the tachometer circuit 106, and an address converting unit 73 connected to the first counter 71 and the accessor control unit 63.

The director 61a is classified as a processor device composed of a ROM (Read Only Memory) 75 recorded with an operation control program of the accessor AL, an MPU (not shown) for executing the operation control program, and a RAM (Random Access Memory; not shown ). The director 61a retains an absolute position of the accessor AL at all times. The director 61a implements processes which follow by the unillustrated MPU executing the operation control program.

To be specific, the host computer H inputs a command of moving the cartridge C to the director 61a. The director 61a receives the cartridge C moving command so addressed to the director 61b from a director 61b of the R-system control module 6b, which command is outputted from the host computer H, and data (an absolute position, a moving direction and a moving velocity) of the accessor AR. On the other hand, the director 61a gives the director 61b of the R-system control module 6b, the cartridge C moving command received from the host computer H and data (an absolute position, a moving direction and a moving velocity) of the accessor AL.

The directors 61a, 61b determine an operation of each of the accessors AL, AR (which is, e.g., an operation of fetching the cartridge C out of the cell 9 or the slot 12 and carrying it) on the basis of the cartridge C moving command obtained from the host computer H, the Cartridge C moving command obtained from the director 61 of other system and addressed to the director 61 of the same other system, and the data of the respective accessors AL, AR. Namely, the directors 61a, 61b execute scheduling.

At this time, each of the directors 61a, 61b determines the operation of the accessor that should be controlled by the accessor itself (which operation is, e.g., that the accessor AL or AR fetches a predetermined cartridge C by its moving to a predetermined drum unit 2 from the home position, carries the same cartridge C to a predetermined recording/reproducing unit 3, and loads the cartridge C into the recording/reproducing device 11 of the recording/reproducing unit 3, and so on) so that operating efficiencies of the accessors AL and AR are optimized without the accessors not abnormally approaching each other.

Then, each of the directors 61a, 61b gives the accessor control unit 63 the thus determined operation command of each of the accessors AL, AR (which command is to move the accessor Al or AR to a moving target position from a start-of-movement position on the basis of the determined operation). This operation command contains an absolute position of the start-of-movement position and an absolute position of the moving target position (an end-of-movement position).

Further, the operation control program recorded in the ROM 75 of each of the directors 61a, 61b contains a recovery operation control program. This recovery operation control program is executed when the accessors AL, AR abnormally stop. Upon the execution of this recovery operation control program, the accessor Al and/or the accessor AR reverts to a status before being stopped.

Note that these directors 61a, 61b correspond to a determining device and a re-executing device according to the present invention.

The accessor control unit 63 is defined as a processor device constructed of a ROM recorded with the control program, a RAM for executing the control program and a RAM (each of which is not illustrated). The accessor control unit 63 performs the following processes by the unillustrated MPU executing the control program.

To be specific, the accessor control unit 63, when receiving the operation command of the accessor AL from the director 61a, generates a moving command of the accessor AL (which is a relative moving quantity of the accessor AL) on the basis of the start-of-movement position and the moving target position that are contained in the same operation command, and gives this moving command to the servo control unit 64a.

The servo control unit 64a is defined as a processor device constructed of a ROM 77 recorded with a control program and an operation monitoring program, an unillustrated MPU for executing the control program, an unillustrated RAM, and an unillustrated clock generator circuit. This servo control unit 64a controls driving of the X-motor 105 and controls monitoring of the accessors. The servo control unit 64a carries out the following processes by executing the control program by way of the drive control of the X-motor 105.

That is, the servo control unit 64a generates drive commands (such as, e.g., a start-of-drive command, a number-of-rotations increment/decrement command, a driving direction changing command, or a drive stop command etc) of the X-motor 105 on the basis of the accessor AL relative moving quantity received from the accessor control unit 63, and gives these drive commands to the driving circuit 68.

The driving circuit 68, upon receiving the drive command of the X-motor 105 from the servo control unit 64, supplies the X-motor 105 with driving electric power for the X-motor 105. The X-motor 105 thereby performs the operation (e.g., the start of drive, increment or decrement of the number of rotations, or the stop of drive etc) corresponding to a drive signal, whereby the X-directional drive of the accessor AL is controlled. For instance, if the drive command received by the driving circuit 68 is the start-of-drive command of the X-motor 105, upon the start of driving the X-motor 105, the accessor AL remaining stopped begins to travel along the guide rail 7 in the X-direction.

The tachometer circuit 106 is a circuit for generating signals (pulses) indicating a quantity of rotations. The fist and second counters 71, 72 are defined as circuits for counting the pulses outputted from the tachometer circuit 106. The number of pulses counted by the first counter 71 is inputted to the address converting unit 73. On the other hand, the number of pulses counted by the second counter 72 is inputted to the serv control unit 64. The second counter 72 is provided independently of the first counter 71 so that the number of pulses can be inputted to the servo control unit 64a irrespective of any faults in the first counter 71.

The numbers of pulses are counted by the first and second counters 71, 72, in which case a point of time when the accessor AL is in the home position is set to "0". The number of pulses increases when the accessor AL travels toward the garage unit R1 but decreases when traveling toward the garage unit L1. On the other hand, the numbers of pulses are counted by the first and second counters 71, 72 of the R-system control module 6b, in which case a point of time when the accessor AR is in the home position is set to "0". The number of pulses increases when the accessor AR travels toward the garage unit L1 but decreases when traveling toward the garage unit R1.

The address converting unit 73 is a circuit for converting the number of pulses counted by the firs counter 71 into an actual position (an absolute position) of the accessor AL. Herein, the address converting unit 73 possesses data about an origin (X=0) of the absolute position and data about a length corresponding to one pulse. In accordance with this embodiment, the origin of the absolute position of the accessor AL is set in the home position of the accessor AL, while the origin of the absolute position of the accessor AR is set in the home position of the accessor AR. This address converting unit 73 calculates the absolute position of the accessor AL that corresponds to the number of pulses inputted from the first counter 71 on the basis of the origin data of the absolute position and the length data corresponding to one pulse, and gives the thus calculated absolute position to the accessor control unit 63.

Thereupon, the accessor control unit 63 calculates a relative moving quantity and an absolute position of the accessor AL on the basis of the absolute position of the moving target position of the accessor AL that are received from the director 61a, and the absolute position (the present position) received from the address converting unit 73. The accessor control unit 63 then gives the servo control unit 64a an accessor AL moving command based on the above relative moving quantity and absolute position thereof. Then, the servo control unit 64a controls the X-motor 105 according to the moving command.

Thus, a feedback loop is formed of the accessor control unit 63, the servo control unit 64a, the driving circuit 68, the X-motor 105, the tachometer circuit 106, the first counter 71 and the address converting unit 73. The accessor control unit 63 controls the movement of the accessor AL in conjunction with the present position of the accessor AL.

Note that the accessor control unit 63, the servo control unit 64a, the driving circuit 68 and the X-motor 105 correspond to a movement control device according to the present invention.

Further, the accessor control unit 63 supplies the director 61a with the accessor AL absolute position received from the address converting unit 73. The direction 61a thereby obtains the absolute position of the accessor AL, and the accessor AL absolute position possessed by the director 61a is updated. Further, the director 61a calculates the moving direction and the moving velocity of the accessor AL on the basis of the accessor AL absolute position to be inputted and an update time of the absolute time etc.

Monitoring of Accessor's Operation in Library Apparatus

Next, in the control device 6 shown in FIG. 6, a construction for monitoring the operations of the accessors AL, AR will be explained. The ROM 77 of the servo control unit 64a (the servo control unit 64b) shown in FIG. 6, is recorded with an operation monitoring program in addition to the control program. The unillustrated MPU of the servo control unit 64a executes this operation monitoring program and thereby implement a following control process of monitoring the operation of the accessor.

More specifically, the servo control unit 64a, upon an input of the number of pulses from the second counter 72, executes the same processes as those by the address converting unit 73 as well as by the director 61a, and calculates the absolute position (the present position), the moving direction and the moving velocity of the accessor AL.

Further, the servo control unit 64a obtains an operation mode of the accessor AL on the basis of the absolute position and the moving direction of the accessor AL and the moving command obtained from the accessor control unit 63. Herein, the servo control unit 64*a* obtains, as the operation mode of the accessor AL, any one of a classification of executing operations (e.g., a carry operation of the cartridge C, a fetching operation of the cartridge C, or a housing operation of the cartridge), an execution status (such as traveling in process, damping in process, remaining stopped, remaining ceased (a case of the X-motor 105 being switched OFF), being in an abnormality process (a case of recovering an abnormal state of the accessor), or being in an undetermined state (where the absolute position of the accessor is still unknown).

Further, the servo control unit 64*a* obtains the absolute position of the moving target position of the accessor AL on the basis of the moving command (the absolute position and the relative moving quantity of the accessor AL) obtained from the accessor control unit 63, and the absolute position of the accessor AL. Namely, the servo control unit 64*a* acquires, as the absolute position of the moving target position, an X-direction absolute position of the accessor AL, which corresponds to a position of the desired cell 9 or slot 12.

Moreover, the servo control unit 64*a* detects an operation state of each of the units of the L-system control module 6*a* and the accessor AL, based on the absolute position (the present position), the moving direction, the moving velocity, the operation mode and the moving target position of the accessor AL. That is, the servo control unit 64*a* calculates some pieces of data used for an initial diagnosis (an operation check of each of the units of the L-system control module 6*a* and the accessor AL, which is conducted when switching ON the power supply of the library apparatus 100) from the above-described data, by way of operating states of the accessor AL and of the driving circuit 68. These processes by the servo control unit 64*a* are executed in the same way by the servo control module 64*b* of the R-system control module 6*b*.

The servo control unit 64*a* stores a monitoring table 65*a* with the data obtained by the above processes, which table is created within the register 65. Further, the servo control unit 64*a* transmits these pieces of data to the R-system control module 6*b* via the communication table 30 (see FIG. 5), and stores, with the same data, the monitoring table 65*a* in the R-system control module 6*b*. On the other hand, the servo control unit 64*b* of the R-system control module 6*b* stores the monitoring table 65*a* of the self-system with the data obtained by the above processes, the transmits the same data to the L-system control module 6*a* via the communication table 30, and stores the monitoring table 65*a* in the L-system control module 6*a* with the same data.

FIG. 7 is an explanatory chart showing the monitoring table 65*a*. With the processes by the servo control modules 64*a*, 64*b*, the monitoring table 65*a* is stored with the absolute positions (the present positions), the moving directions, the moving velocities, the operation modes, the operation statuses, and the absolute positions of the moving target positions of the respective accessors AL, AR.

Each of the servo control modules 64*a*, 64*b* becomes thereby capable of monitoring the operation of the accessor of the self-system with reference to the data stored in the monitoring table 65*a* as well as of monitoring the operation of the accessor of other system. Then, each of the servo control modules 64*a*, 64*b* compares the data of the self-system accessor with the data of the other-system accessor and, if there might be a possibility in which the accessors might collide with each other or abnormally get close to each other, stops the accessors AL, AR by inputting the drive stop command of the X-motor 105 to the driving circuit 68.

Note that the tachometer circuit 106, the second counter 72, the servo control unit 64*a* (64*b*) and the register 65 correspond to a monitoring device according to the present invention, while the tachometer circuit 106, the second counter 72 and the servo control unit 64*a* (64*b*) correspond to a first position detecting device of the present invention.

The servo control monitoring unit 66 is a circuit (a watch dog timer) for monitoring the unillustrated MPU of the servo control unit 64*a*. The servo control monitoring unit 66 detects an operating frequency of the unillustrated MPU of the servo control unit 64*a*, and monitors whether or not the unillustrated MPU operates at a proper cycle. Then, if the operation of the MPU falls into an abnormal state due to a runaway and hang-up etc, the servo control monitoring unit 66 stops the operation of the MPU by inputting a reset signal to the servo control unit 64*a*, and also inputs the reset signal to the cut-off circuit 69.

At this time, the servo control monitoring unit 66 transmits the reset signal also to the servo control monitoring unit 66 of the R-system control module 6*b* via the communication cable 30. This reset signal is inputted to the cut-off circuit 69 and the servo control monitoring unit 66 in the R-system control module 6*b*. The servo control monitoring unit 66 of the R-system control module 6*b*, upon receiving the reset signal, stops the operation of the unillustrated MPU of the servo control unit 64*b*.

The cut-off circuit 69, upon an input o the reset signal from the servo control monitoring unit 66, stops the drive of the X-motor 105 by cutting off the supply of the electric power to the driving circuit 68. Thus, in the library apparatus 100 in the embodiment 1, each of the accessors AL, AR stops even if any one of the unillustrated MPUs of the servo control units 64*a*, 64*b* becomes abnormal. Note that servo control monitoring unit 66 and the cut-off circuit 69 correspond to a second stopping device of the present invention.

The accessor control unit 63, when detecting the reset signal transmitted from the servo control monitoring unit 66, recognizes that the abnormality occurs in the unillustrated MPU of the servo control unit 64*a*, and notifies the director 61*a* of this purport. Further, the accessor control unit 63 receives a restart command of the unillustrated MPU of the servo control unit 64 from the director 61*a*, and supplies the restart signal to the unillustrated MPU of the servo control nit 64*a*.

Processes by Servo Control Unit

In the library apparatus 100 described above, the servo control units 64*a*, 64*b* monitor the accessors AL, AR, and, if there might be the possibility of the accessors colliding with each other or abnormally approaching each other, stop the operations of the accessors AL, AR. There will hereinafter be explained processes (a process of monitoring the accessor, and a process of urgently stopping and protecting the accessor) by the servo control units 64*a*, 64*b*. The processes by the servo control unit 64*a* are substantially the same as those by the servo control unit 64*b* and therefore herein explained by way of an example.

Figure 8:
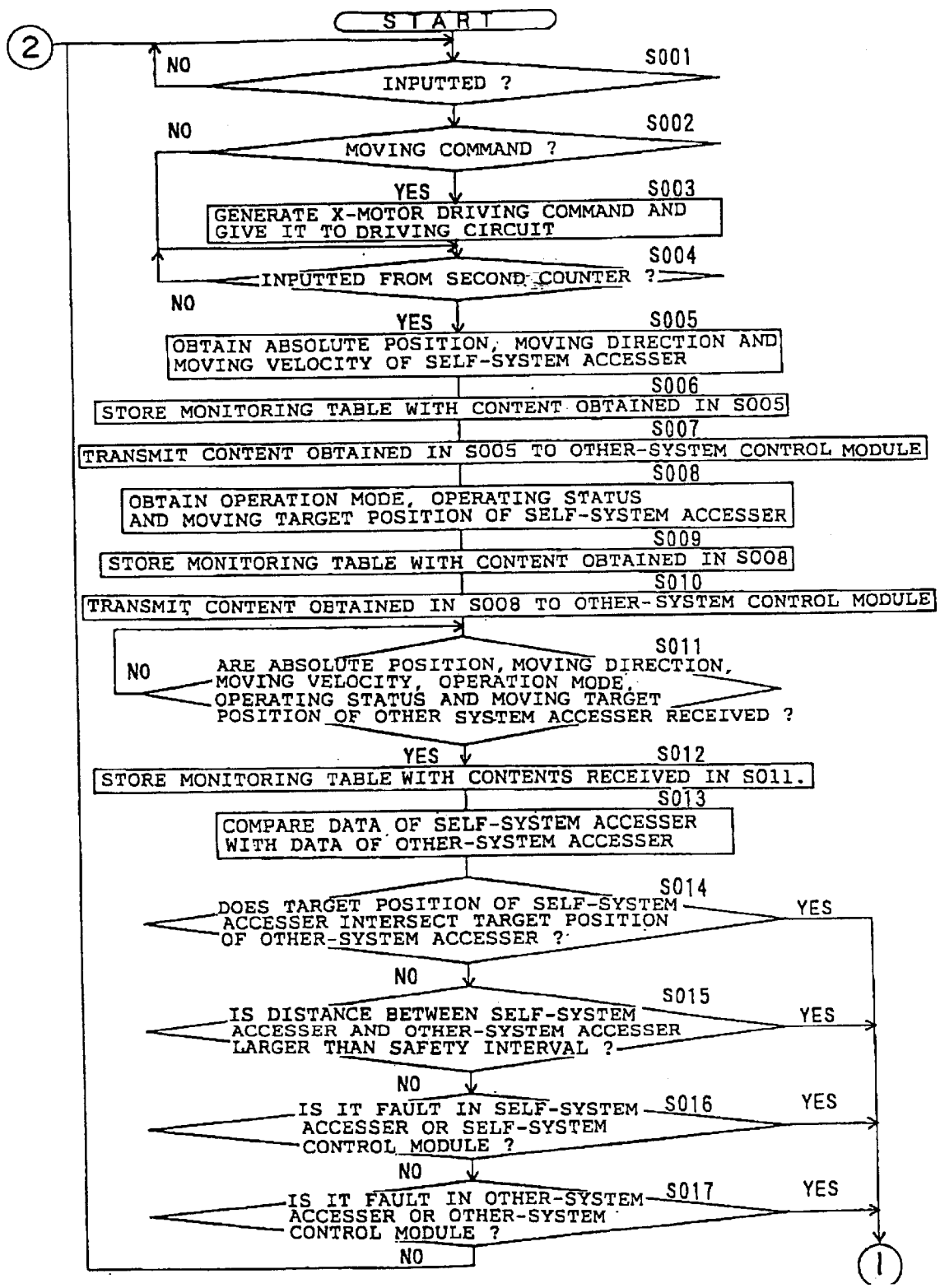
FIG. 8 is a flowchart showing processes of a servo control unit shown in FIG. 6.
Figure 9:
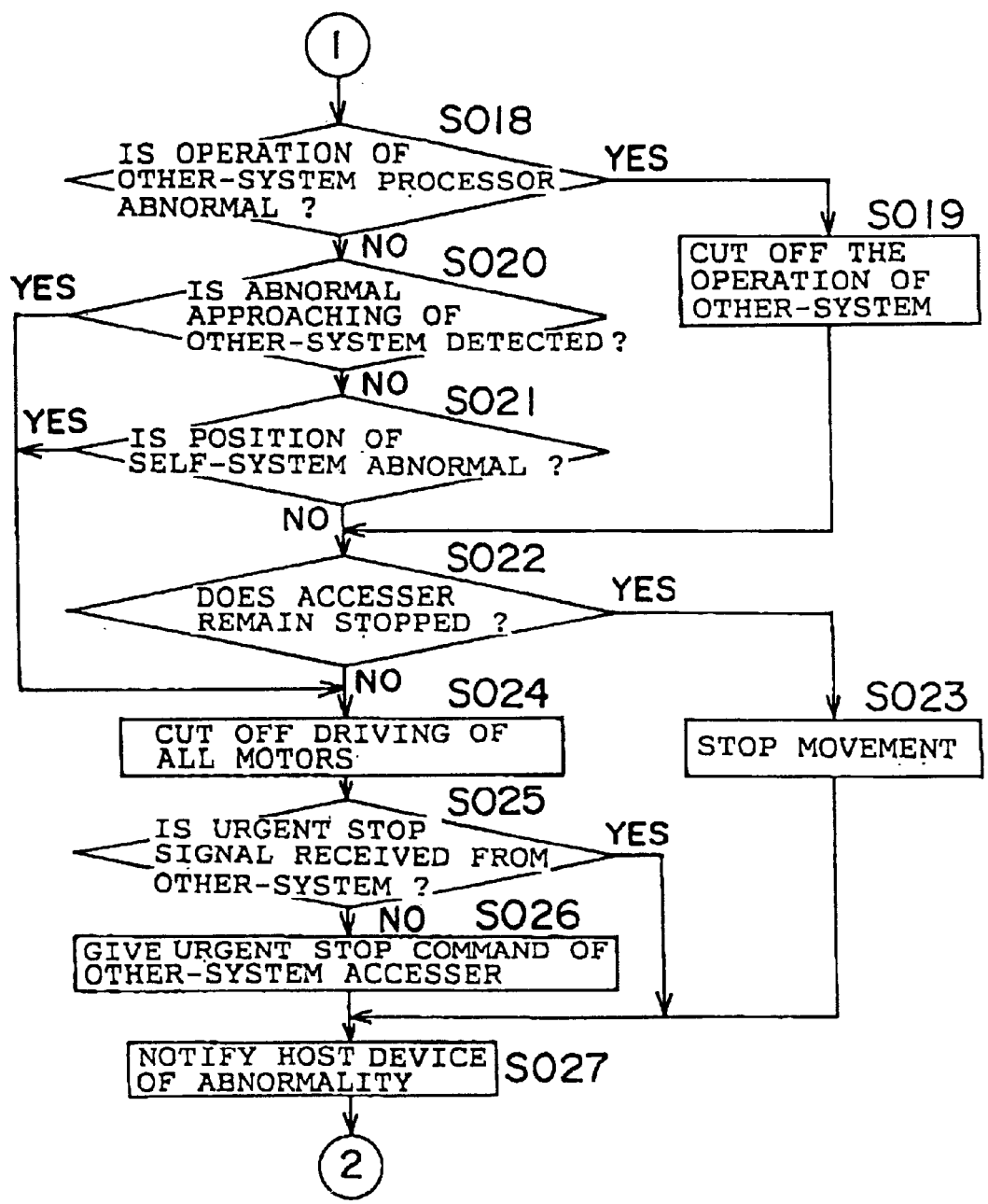
FIG. 9 is a flowchart showing the processes of the servo control unit shown in FIG. 6.

FIG. 8 is a flowchart showing a process of the servo control unit 64*a* monitoring the accessor AL. FIG. 9 is a flowchart showing the process of urgently stopping and protecting the accessor AL. Referring to FIG. 8, the processes by the servo control unit 64*a* start on the premise of the processing which follows.

Namely, the host computer H inputs a moving command of the cartridge C to each of the director 61a of the L-system control module 6a and the director 61b of the R-system control module 6b. The respective directors 61a, 61b executes the scheduling based on the cartridge C moving command received, and gives an accessor operating command to each of the accessor control units 63, 63. The accessor control units 63, 63 give the accessor moving commands corresponding to the accessor operating commands to the servo control units 64a, 64b. The servo control units 64a, 64b thereby start the processing. Note that the description is given on the assumption that the self-system accessor shown in FIGS. 8 and 9 is the accessor AL, while the other-system accessor is the accessor AR.

At the first onset, the servo control unit 64a accepts signals from outside (step S001). When the signals from outside are inputted to the servo control unit 64a (S001; YES), the servo control unit 64a judges whether or not the signal is defined as an accessor moving command from the accessor control unit 63 (step S002). At this time, the servo control unit 64a, if the inputted signal is defined as the moving command (S002; YES), supplies the driving circuit 68 with a drive command of the X-motor 105 which corresponds to the moving command (step S003), and makes the processing proceed to step S004.

Upon the process in step S003, the X-motor 105 is actuated, with the result that the accessor AL travels along the guide rail 7 in the X-direction. At this time, t second counter 72 counts the pulses indicating a quantity of rotations of the X-motor 105, and the number of pulses is inputted to the servo control unit 64a.

In step S004, the servo control unit 64a accepts an input from the second counter 72. The servo control unit 64a, when inputting the number of pulses from the second counter 72, obtains an absolute position, a moving direction and a moving velocity of the accessor AL from the number of pulses (step S005). Subsequently, the servo control unit 64a updates each of the absolute position, the moving direction and the moving velocity of the self-system accessor within the monitoring table 65a (see FIG. 7) with the content obtained in step S005 (step S006). Subsequently, the servo control unit 64a transmits the content obtained in step S005 to the other-system control module (which is herein the R-system control module 6b) (step S007).

By the process in step S007, the absolute position, the moving direction and the moving velocity of the accessor AL are supplied to the R-system control module 6b via the communication cable 30. With this processing, the absolute position, the moving direction and the moving velocity of the other-system accessor are stored (overwritten to) in the monitoring table 65a of the R-system control module 6b.

Next, the servo control unit 64a obtains an operation mode, an operating status and an absolute position of a moving target position of the accessor AL on the basis of the moving command (the absolute position and the relative moving quantity of the accessor AL) inputted in step S002, and the absolute position, the moving direction and the moving velocity of the accessor AL that are obtained in step S005 (step S008 ).

Subsequent thereto, the servo control unit 64a overwrites the content obtained in step S008 to the monitoring table 65a (step S009). Subsequently, the servo control unit 64a transmits the content obtained in step S008 to the other-system control module (which is herein the R-system control module 6b) (step S010).

By the process in step S010, the operation mode, the operating status and the absolute position of the moving target position of the accessor AL, are given via the communication cable 30 to the R-system control module 6b. The operation mode, the operating status and the absolute position of the moving target position are each thereby stored (overwritten to) in the monitoring table 65a of the R-system control module 6b.

Next, the servo control unit 64a judges whether or not the absolute position, the moving direction, the moving velocity, the operation mode, the operating status and the absolute position of the moving target position of the accessor AR (the other-system accessor), are received from the R-system control module 6b (step S001). At this time, the servo control unit 64a, when judging that each piece of data is received (step S001; YES), make the processing proceed to step S012. The servo control unit 64a, whereas if the judgement is that the data is not received (step S011; NO), executes the process in step S011 till a "YES" judgement is made.

When the processing proceeds to step S012, respective pieces of data received in step S011 are stored (overwritten to) in the monitoring table 65a of the L-system control module 6a, as the absolute position, the moving direction, the moving velocity, the operating mode, the operating status and the absolute moving target position of the accessor AR.

Next, the servo control unit 64a compares the data of the accessor AL that are stored in the monitoring table 65a with the data of the accessor AR (step S013).

Subsequently, the servo control unit 64a judges whether or not the absolute position f the moving target position of the accessor AL intersects (overlaps with) the absolute position of the moving target position of the accessor Ar (step S014). The intersecting between the absolute positions of the moving target positions implies that the absolute position of the moving target position of the accessor AL is closer to the home position of the accessor AR than the absolute position of the moving target position of the accessor AR. The servo control unit 64a, when judging that the moving target positions intersect each other (S014; NO), advances the processing to step S015. By contrast, the servo control unit 64a, when judging that the moving target positions intersect each other (step S014; YES), makes the processing proceed to step S018 in order to avoid the collisions between the accessors AL and AR.

The servo control unit 64a, when making the processing proceed to step S015, judges whether or not a distance between the accessors AL and AR is equal to a predetermined safety spacing or wider. More specifically, the servo control unit 64a reads the absolute position (the present position) of each of the accessors from the monitoring table 65a, calculates the distance between the accessors Al and AR, compares the inter-accessor distance with a threshold value of the safety spacing that is retained by the servo control unit itself, and judges whether or not the inter-accessor distance is above the threshold value. herein, the servo control unit 64a has a plurality of safety spacing threshold values, properly selects the threshold value in accordance with the operation mode, the moving velocity and the moving direction of the accessor AL or AR, and compares the selected threshold value with the inter-accessor distance.

The servo control unit 64a, when judging from a result of the comparison that the inter-accessor distance is equal to the threshold value or greater (step S015; YES), makes the processing proceed to step S016. In contrast thereto, the servo control unit 64a, when judging that the inter-accessor distance is less than the threshold value (step S015; NO), makes the processing proceed to step S018 in order to avoid the collision between the accessors AL and AR.

The servo control unit 64a, when the processing proceeds to step S016, reads the accessor AL operating status from the monitoring table 65a, and judges whether or not any fault occurs in the accessor AL or the L-system control module 6a. Namely, the servo control unit 64a judges whether not the operating status stored in the monitoring table 65a falls within a normal range. At this time, the servo control unit 64a, when judging that the operating status falls within the normal range (S016; NO), makes the processing proceed to step S017. By contrast, the servo control unit 64a, when judging that the operating status does not fall within the normal range (S016; YES), advances the processing to step S118 in order to stop the operation of the accessor AL.

The servo control unit 64a, when making the processing proceed to step S017, reads the accessor AR operating status from the monitoring table 65a, and judges whether or not any fault is caused in the accessor Ar or the R-system control unit 6b. That is, the servo control unit 64a judges whether or not the operating status stored in the monitoring table 65a falls within the normal range. At this time, the servo control unit 64a, when judging that the operating status falls within the normal range (S017; NO), returns the processing to step S001. In contrast thereto, the servo control unit 64a, when judging that the operating status does not fall within the normal range (S017; YES), advances the processing to step S118.

As shown in FIG. 9, the servo control unit 64a, in the case of making the processing proceed to step S018, judges whether or not the operation of the unillustrated MPU of the servo control unit 64b in the R-system control module 6b (the other system) is abnormal. The servo control unit 64a makes this judgement based on the accessor AR operating status stored in the monitoring table 65a. At this time, the servo control unit 64a, when judging that the operation of the unillustrated MPU of the servo control unit 64b is abnormal (S018; YES), stops the operation of the same MPU (step S019). Namely, the servo control unit 64a outputs a reset signal to the R-system control module 6b, and makes the processing proceed to step S022. The reset signal is inputted to the unillustrated MPU of the servo control unit 64b. Thereupon, the unillustrated MPU stops the operation.

The servo control unit 64a, whereas if the judgement is that the operation of the unillustrated MPU of the servo control unit 64b is not abnormal, detects an abnormal approach of the other system, i.e., judges whether or not the judgement in step S015 is that the inter-accessor distance is less then the predetermined threshold value (step S020). At this time, the servo control unit 64a, if the judgement in step S015 is that the inter-accessor distance is less than the threshold value (S020; YES), makes the processing proceed to step S024. Whereas if the judgement in step S015 is that the inter-accessor distance is not less than the threshold value (S020; NO), the servo control unit 64a advances the processing to step S021.

The servo control unit 64a, when making the processing proceed to step S021, judges whether or not the present position of the accessor AL is abnormal on the basis of the absolute position of the self-system accessor and the absolute value of the moving target position within the monitoring table 65a, i.e., whether or not the accessor AL exists in a position in which the accessor AL actually should be located. Further, the servo control unit 64a also judges whether or not there is no deviation between the accessor AL position grasped by the director 61a and the actual position of the accessor AL. At this time, the servo control unit 64a, when judging that the position of the self-system accessor is abnormal (S021; YES), makes the processing proceed to step S024. In contrast, the servo control unit 64a, when judging that no abnormality can be seen in the position of the self-system accessor (step S021; NO), advances the processing to step S022.

The servo control unit 64a, when making the processing proceed to step S022, judges whether or not one of the two accessors, i.e., the accessor AL remains stopped. The servo control unit 64a makes this judgement based on the operation mode within the monitoring table 65a. Then, the servo control unit 64a, in the case of judging that the accessor AL remains stopped (S022; YES), gives a drive stop command to the driving circuit 68 of the L-system control module 6a. The drive of the X-motor 105 is thereby stopped, with the result that the movement of the accessor AL is stopped (step S023). Thereafter, the servo control unit 64a makes the processing proceed to step S027. By contrast, the servo control unit 64a, when judging that the accessor AL is not in the process of stoppage (S022; NO), inputs a reset command to each of the cut-off circuits of the L- and R-system control modules 6a, 6b, thereby stopping the operation of each of the driving circuits 68 (step S024).

Subsequently, the servo control unit 64a judges whether or not an urgent stop signal is received from the R-system control module 6b (step S025). That is, when the accessor AR urgently stops by the process in the step S024, the R-system control module 6b generates the urgent stop signal of the accessor AR and transmits it to the L-system control module 6a. The servo control unit 64a accepts this urgent stop signal for a predetermined time. Then, the servo control unit 64a, when receiving the urgent stop signal (S025; YES), advances the processing to step S027. Whereas if the urgent stop signal is not received (S025; NO), the servo control unit 64a transmits the urgent stop command of the accessor AR to the servo control unit 64b of the R-system control module 6b (step S026), and makes the processing proceed to step S027.

By the process in step S026, the servo control unit 64b of the R-system control module 6b inputs the drive stop signal to the driving circuit 68 of the R-system control module 6b, thereby stopping the drive of the X-motor 105. With this processing, the accessor AR, which does not stop by the process in step S024, comes to stop.

Then, the servo control unit 64a, when making the processing proceed to step S027, notifies the accessor control unit 63 and the director 61a that are defined as host devices of the control unit 64 itself, of the purport that the operations of the accessors AL, AR are stopped. At this time, the servo control unit 65b operates in the same way as the servo control unit 64a. Thereupon, each of the directors 61a, 61b specifies an accessor operation command (the accessor operation command interrupted) given last time to the accessor control unit 63 before each of the accessors AL, AR is stopped, and retains the same command.

Upon an end of the process in step S027, the processes by the servo control unit 64a terminate, and the processing goes back to step S001. That is, the servo control unit 64a comes into a standby status waiting for a command from the direction 61a, which is inputted via the accessor control unit 63.

Processes by Director

As discussed above, if the accessors' AL, AR are stopped by the processes of the respective servo control units 64a, 64b, the unillustrated MPU in each of the directors 61a, 61b executes a recovery processing control program recorded in the ROM 75. Each of the directors 61a, 61b thereby executes a recovery process of the library apparatus 100.

Figure 10:
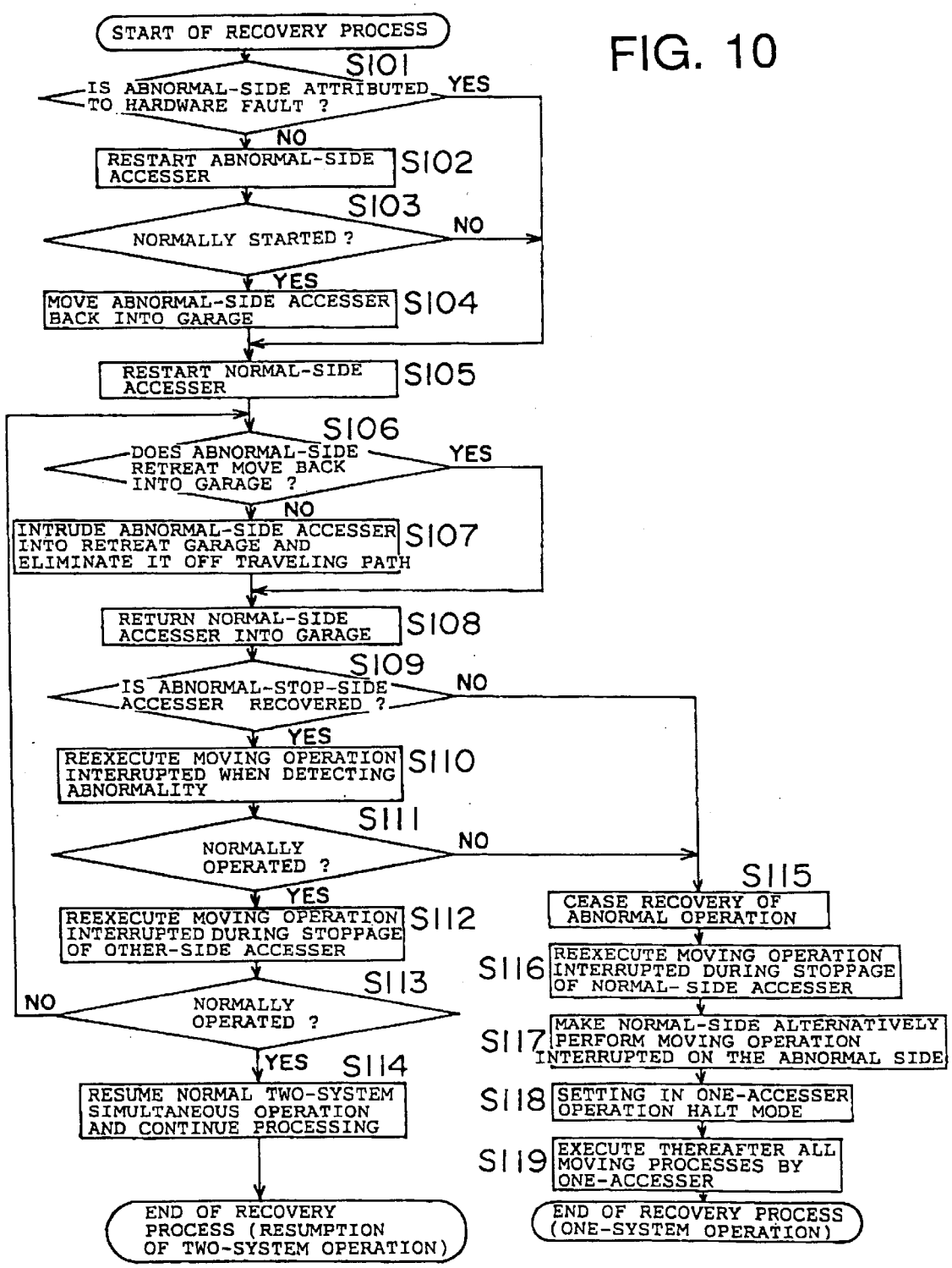
FIG. 10 is a flowchart showing processes of a director shown in FIG. 6.

FIG. 10 is a flowchart showing the recovery process by the directors 61a, 61b. Referring to FIG. 10, the processes by the directors 61a, 61b start just when the servo control unit 64a notifies the director 61a of the above-described accessor stoppage. Herein, it is assumed that a side of the R-system control module 6b (the accessor AR) is defined as a side on which the abnormality occurs (an abnormal side), while the L-system control module 6a is defined as a normal side.

At first, based on the content of the notification from the servo control unit 64a, the director 61a judges whether or not the urgent stop of the accessor is derived from a fault in the hardware (which herein implies the accessor AR or the R-system control module 6b) on the abnormal side (step S101). Namely, the director 61a judges whether or not the content of the notification from the servo control unit 64 indicates the urgent stop f the accessor due to the fault in the hardware. At this time, the director 61a, when judging that the urgent stop is caused by the fault in the hardware (step S101; YES), makes the processing proceed to step S105. While on the contrary, the director 61a, when judging that the urgent stop is not caused by the fault in the hardware (S101; NO), advances the processing to step S102.

When the processing advances to step S102, the director 61a restarts the accessor AR defined as the abnormal-side accessor. Namely, the director 61a gives the restart command of the accessor AR to the director 61b of the R-system control module 6b via the communication cable 30.

Thereupon, the director 61b f the R-system control module 6b issues an operation check command of the accessor AR to the servo control unit 64b via the accessor control unit 63. The servo control unit 64b gives an operation check drive command to the driving circuit 68. Then, the driving circuit 68 drives the X-motor 105 of the accessor AR. The accessor AR thereby travels along the guide rail 7. At this time, the director 61b has accessor AR's Y- and Z-directional operations checked.

Next, the director 61b judges whether or not the accessor AR is normally restarted (step S103). That is, the director 61b judges whether or not the accessor AR absolute position inputted from the address converting unit 73 fluctuates corresponding to an elapse of time. At this time, the director 61b, when judging that the accessor AR is normally restarted (S103; YES), makes the processing proceed to step S104. While on the contrary, the director 61b, when judging that the accessor Ar is not normally restarted (step S103; NO), notifies the director 61a of the L-system control module 6a, of this purport, and makes the processing proceed to step S105.

When the processing proceeds to step S104, the director 61b causes the abnormal-side accessor to move back into the garage. More specifically, the director 61b gives a retreat command of the accessor AR to the servo control unit 64b. The retreat command of the accessor AR is thereby given to the driving circuit 68, and the driving circuit 68 makes the accessor AR travel into the garage unit R1. At this time, the director 61b monitors the accessor AR absolute position inputted from the address converting unit 73. Then, the absolute position of the accessor AR becomes the home position, at which time the director 61b notifies the director 61a of the effect that the accessor AR normally operates and moves up to the home position.

When the processing proceeds to step S105, the director 61a restarts the normal-side accessor. That is, the director 61a executes the same processes as those implemented by the director 61b, thereby restarting the accessor AL.

Subsequently, the director 61a judges whether or not the abnormal-side accessor retreats into the garage (step S106). Namely, the director 61a judges whether or not the notification purporting that the accessor AR moves up to the home position is received from the director 61b. At this time, the director 61a, when judging that the notification is received (S106; YES), makes the processing proceed to step S108. While on the contrary, the director 61a, when judging that the notification is not received (S106; NO), advances the processing to step S107.

When the processing proceeds to step S107, the director 61a, deeming that the accessor AR remains stopped on the passageway 1 (see FIG. 2), gives a removing command of the accessor AR to the servo control unit 64a. The servo control unit 64a thereby issues a drive command for removing the accessor AR to the driving circuit 68. The accessor AL travels toward the garage unit R1 upon driving the X-motor 105 and comes into contact with the accessor AR remaining stopped on the passageway 1. The accessor AL travels while pushing the accessor AR as it is, and thrust the accessor AR into the garage unit RI. Hereupon, the accessor AR absolute position inputted to the director 61b becomes the home position, and hence the director 61b notifies the director 61a of this purport.

The director 61a, upon receiving the notification from the director 61b, moves the accessor AL up to the home position within the garage unit L1 (step S108). Subsequently, the director 61a judges whether or not the abnormal side is recovered (step S109). That is, the director 61a judges whether or not the notification purporting that the accessor AR normally operates and moves to the home position, is received from the director 61b. At this time, the director 61a, when judging that the notification is received (step S109; YES), makes the processing proceed to step S110. By contrast, the director 61a, when judging that the notification is not received (S109; NO), advances the processing to step S115.

When the processing proceeds to step S110, the director 61a notifies the director 61b of the purport of issuing a reexecution command. The director 61b, upon receiving the notification from the director 61a, again gives the accessor control unit 63 a operation command corresponding to the operation conducted when the accessor AR remains stopped. Each of the accessor control unit 63, the servo control unit 64b, the driving circuit 68 and the X-motor 105 thereby operate to have the accessor AR operated. At this time, if the accessor Ar normally operates, the absolute position of the accessor AR is inputted to the director 61b by the tachometer circuit 106, the first counter 71 and the address converting unit 73.

The director 61b refers to the accessor AR absolute position inputted from the address converting unit 73, and thus judges whether or not the accessor AR normally executes the interrupted operation (step S111). At this time, the director 61b, when judging that the accessor AR normally executes the operation (S111; YES), notifies director 61a of the effect that the accessor AR executes the interrupted operation, and the processing proceeds to step S112. While on the other hand, the director 61b, when judging that the accessor AR does not normally execute the operation (S111; NO), makes the processing proceed to step S115.

The director 61a, upon receiving the notification purporting that the accessor AR re-executes the interrupted operation, reads the operation command specified when receiving the notification of stopping the accessor AL from the servo control unit 64*a,* and lets the accessor AL reexecute the interrupted operation by giving the same command to the accessor control unit 63 (step S12). With this processing, each of the accessor control unit 63, the servo control unit 64*a,* the driving circuit 68 and the X-motor 105 operates, and the accessor AL resumes the operation interrupted. Then, the absolute position of the accessor AL is inputted to the director 61*a* by the tachometer circuit 106, the first counter 71 and the address converting unit 73.

The director 61*a* refers to the accessor AL absolute position inputted from the address converting unit 73, and thus judges whether or not the accessor AL normally executes the interrupted operation (step S113). At this time, the director 61*a,* when judging that the accessor AL normally executes the operation (S113; YES), makes the processing proceed to step S114. While on the contrary, the director 61*a,* when judging that the accessor AL does not normally execute the operation (S113; NO), returns the processing to step S106.

When the processing proceeds to step S114, the director 61*a* notifies the director 61*b* of the effect that the accessor AL normally re-executes the operation. Then, the directors 61, 61*b* respectively operate the accessors AL, AR in accordance with a result of the scheduling done before the accessors AL, AR stop. Upon an end of the process in step S114, the recovery process by the directors 61*a,* 61*b* is finished.

On the other hand, when the processing proceeds to step S115, the director 61*b* halts the operation recovery of the accessor AR. To be specific, the director 61*b* gives an operation halt command f the accessor AR to the servo control unit 64*b.* The servo control unit 64*b,* after moving the accessor AR to the home position, gives a drive stop command to the driving circuit 68, thereby stopping the accessor AR. Further, the director 61*b* notifies the director 61*a* of the purport that the recovery of the accessor AR is halted.

The director 61*a,* when receiving the notification from the director 61*b,* executes the same process as step S112, and causes the accessor AL to reexecute the interrupted operation (step S116). Then, upon terminating the reexecution of the interrupted operation, the director 61*a* gives the accessor control unit 63 an operation command corresponding to the interrupted operation of the accessor AR. Thus, the accessor AL is made to reexecute the interrupted operation of the accessor AR (step S117).

Subsequently, the 61*a* sets the library apparatus 100 in a single accessor operation halt mode (step S118). That is, the director 61*a* changes the mode to a mode in which the director 61*a* itself accepts all the cartridge C moving commands transferred from the host computer H. Then, the director 61*a* controls the accessor AL in accordance with the cartridge C moving command transferred from the host computer H. Namely, the library apparatus 100 comes into a status of executing the processes for the cartridge C by the operation of only the accessor AL. Thereafter, the recovery process of the library apparatus 100 by the directors 61*a,* 61*b* comes to an end.

Effect of Embodiment 1

According to the library apparatus 100 in the embodiment 1, the data of the accessors AL, AR are stored in the monitoring table 65*a* of the L-system control module 6*a* as well as in the monitoring table 65*a* of the R-system control module 6*b,* and the respective servo control units 64*a,* 64*b* monitor the accessors AL, AR by use of the monitoring tables 65*a.* Then, the servo control units 64*a,* 64*b,* as a result of monitoring, if there is a possibility in which the accessors AL, AR collide with each other or abnormally approach each other, stop the two accessors regardless of the control by the directors 61*a,* 61*b.*

As described above, the library apparatus 100 is provided, in the proximal to the X-motors 105 (the driving circuits 68) of the accessors AL, AR, with the construction for preventing the accessors AL, AR from the collision irrespective of the control by the directors 61*a,* 61*b.* It is therefore feasible to prevent the accessors AL, AR from colliding with each other or abnormally approaching each other if there is a deviation between the positional data of the accessor AL or AR possessed by the director 61*a* or 61*b* and the actual position of the accessor AL or AR, and even if there is produced an error in the scheduling result of the accessors AL and AR due to the above deviation. Further, it is possible to prevent the accessors from colliding with each other or abnormally approaching each other, which might occur due to, for example, faults in the traveling member 101 of the accessor AL or AR, the first counter 71 and the address converting unit 73.

Namely, according to the library apparatus 100 in the embodiment 1, it is feasible to prevent the collision or the abnormal approach between the accessors, which might be caused due to the deviation between the positional data retained by the director 61*a* or 61*b* and the actual position, or due to the faults in the components of the library apparatus 100 that exist subordinate to the directors 61*a,* 61*b.* Accordingly, there can be prevented a damage to the accessor AL or AR due to the collision between the accessors, and damages to the cartridge C and to the respective units.

Moreover, according to the library apparatus 100 in the embodiment 1, if the accessors AL, AR are stopped because of the processes by the servo control units 64*a,* 64*b,* the MPUs of the directors 61*a,* 61*b* execute the recovery process control program. The directors 61*a,* 61*b* thereby recover at least one of the accessors AL, AR, and make the library apparatus 100 resume automatically the operation. Accordingly, the each of the accessors AL, AR stops in emergency, in which case there is no necessity for a human involvement in the resumption of the operation of the library apparatus 100. That is, the operating efficiency of the library apparatus 100 can be enhanced because of the resumption of the operation not depending on the human hands, and the library apparatus 100 can be operated more smoothly than in the prior art.

Further, according to the library apparatus 100 in the embodiment 1, the servo control monitoring units 66 provided in the L- and R-system control modules 6*a,* 6*b,* monitor the servo control units 64*a,* 64*b.* Then, if the operations of the servo control units 64*a,* 64*b* become abnormal, the servo control monitoring unit 66 inputs the reset signal to the cut-off circuit 69. The drive of the X-motor 105 for each of the accessors AL, AR is thereby stopped, whereby the each of the accessors AL, AR stops. Hence, it is possible to prevent the collision or the abnormal approach between the accessors due to the operational abnormalities of the servo control units 64*a,* 64*b.* Further, if the accessors AL, AR stop due to the operational abnormalities of the servo control units 64*a,* 64*b,* the accessor control unit 63 resumes the operations of the servo control units 64*a,* 64*b* in accordance with the commands given from the directors 61*a,* 61*b.* Therefore, the recovery operation of the library apparatus 100 is automatically carried out.

Embodiment 2

Next, the library apparatus in accordance with an embodiment 2 of the present invention will be described. In the library apparatus 100 in the embodiment 1, the position of each of the accessors AL, AR is detected based on the pulses emitted from each of the tachometer circuits 106 in the L- and R-system control modules 6a, 6b.

If the fault etc occurs in the tachometer circuit 106, however, the servo control units 64a, 64b become incapable of recognizing the accurate positions of the accessors, and therefore an incorrect drive command is issued to the driving circuit 68, resulting in such a possibility that the accessors might collide with each other or approach each other.

The library apparatus in the embodiment 2 is contrived to obviate the problems described above. Incidentally, the library apparatus in the embodiment 2 has multiplicity of points common to the library apparatus in the embodiment 1, and therefore mainly differences therebetween are explained.

Traveling Mechanism of Accessor

Figure 11:
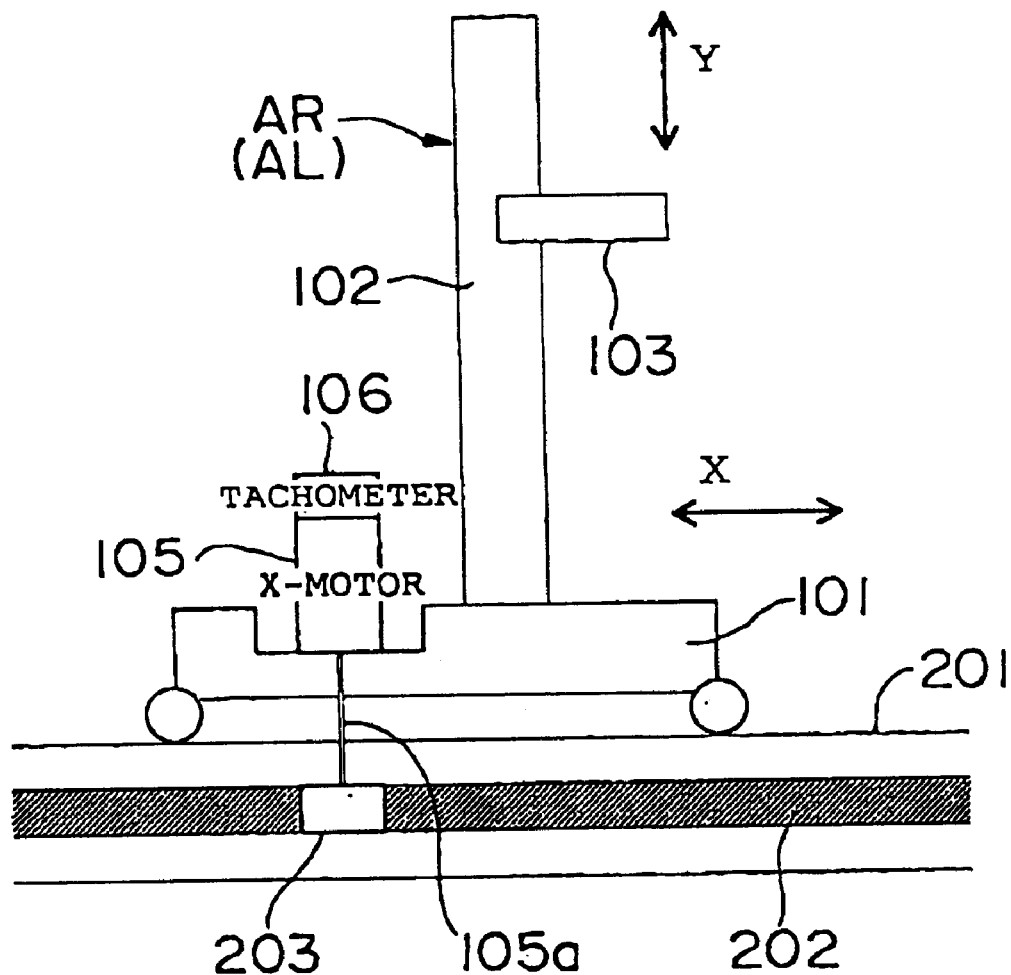
FIG. 11 is an explanatory view showing an accessor in an embodiment 2.

To start with, a traveling mechanism of the accessor in the embodiment 2 will be explained by exemplifying the accessor AL. FIG. 11 is a schematic view of the accessor AL (the accessor AR) in the embodiment 2 as viewed in the front direction of the drum units 2f–2h. Referring to FIG. 11, a guide rail 201 in the embodiment 2 is formed in substantially a C-shape in section, and a rack 202 is formed in the X-direction.

The accessor AL is placed on the guide rail 201. The traveling member 101 of this accessor AL is mounted with the X-motor 105. A driving shaft 105a extends in the Y-direction from the lower part of the X-motor 105, and a pinion 203 is provided coaxially with the driving shaft 105a at the terminal of the driving shaft 105a.

The pinion 203 is installed in such a state gear teeth thereof mesh with gear teeth formed in the rack 202, and rotates with rotations of the driving shaft 105a driven by the X-motor 105. When the rack 202 thereby engages with the pinion 203, the accessor Al travels in the X-direction.

Detection of Operation of Accessor

Next, a construction for detecting the operation of the accessor will be explained by exemplifying the accessor AL. The traveling member 101 of the accessor AL is provided with two sensors 80, 81. FIG. 12(a) is an explanatory view showing a positional relationship between the sensors 80, 81 and the rack 202 as viewed downward in the Y-direction. FIG. 12(b) is an explanatory view showing a positional relationship between the sensors 80, 81 and the rack 202 as viewed from the front side of the drum units 2f–2h shown in FIG. 2.

As illustrated in FIG. 12(a), the sensors 80, 81 are attached to the traveling member 101 in such a state that the sensors face to the rack 202 and are spaced a predetermined distance in the Z-direction from the rack 202. Each of the sensors 80, 81 is provided with a metal proximity switch. The sensors 80, 81 detect an approach of each gear tooth of the rack 202. The approaching of the gear teeth of the rack 202 is consecutively detected by the sensors 80, 81, thereby detecting an X-directional movement of the accessor AL.

Further, as shown in FIG. 12(b), the respective gear teeth of the rack 202 (and the pinion 203) are formed as skew gear teeth, and the sensors 80, 81 are provided in a state installing positions deviate from pitches of the gear teeth of the rack 202.

Accordingly, when the accessor AL moves in a direction (a moving direction (1)) in FIG. 12(b)) toward the garage unit R1 from the garage unit L1 shown in FIG. 2, the sensor 80 detects the approaching of the gear teeth of the rack 202 in advance of the sensor 81. When the accessor Al moves in a direction (a moving direction 82) in FIG. 12(b)) toward the garage unit L1 from the garage unit R1, the sensor 205 detects the approaching of the gear teeth of the rack 202 in advance of the sensor 204.

FIG. 13(a) is a diagram showing an example of output signals (pulse waves) of the sensors 80, 81 when the accessor AL moves in the moving direction (1) shown in FIG. 12(b). FIG. 13(b) is a diagram showing an example of the output signals (the pulse waves) of the sensors 80, 81 when the accessor AL moves in the moving direction (2) shown in FIG. 12(b). As shown in FIGS. 13(a) and 13(b),the sensors 80, 81 are provided so that a phase difference of approximately 90° is created in the output signals. Then, the moving direction of the accessor AL is judged from a difference between output signal waveforms of the sensors 80, 81.

That is, the respective pulses rise just when the sensors 80, 81 come into such a positional relationship as to face to the respective gear teeth of the rack 202. At this time, when the accessor AL travels in the moving direction (1) shown in FIG. 12(b), the pulse corresponding to the sensor 80 rises faster than the pulse corresponding to the sensor 81. On the other hand, when the accessor AL travels in the moving direction (2) shown in FIG. 12(a), the pulse corresponding to the sensor 81 rises faster than the pulse corresponding to the sensor 80. Accordingly, the moving direction of the accessor AL can be judged by detecting which pulse rises faster.

Note that the sensors 80, 81 involve the sue of the metal proximity switches, but a type of the proximity switch may be any one of a high frequency type, a capacity type and a magnetic type. Further, optical sensors may be used as the sensors 80, 81 as far as these sensors are capable of detecting at least a moving quantity of the accessor AL (the accessor AR).

Monitoring Control of Accessor

Figure 14:
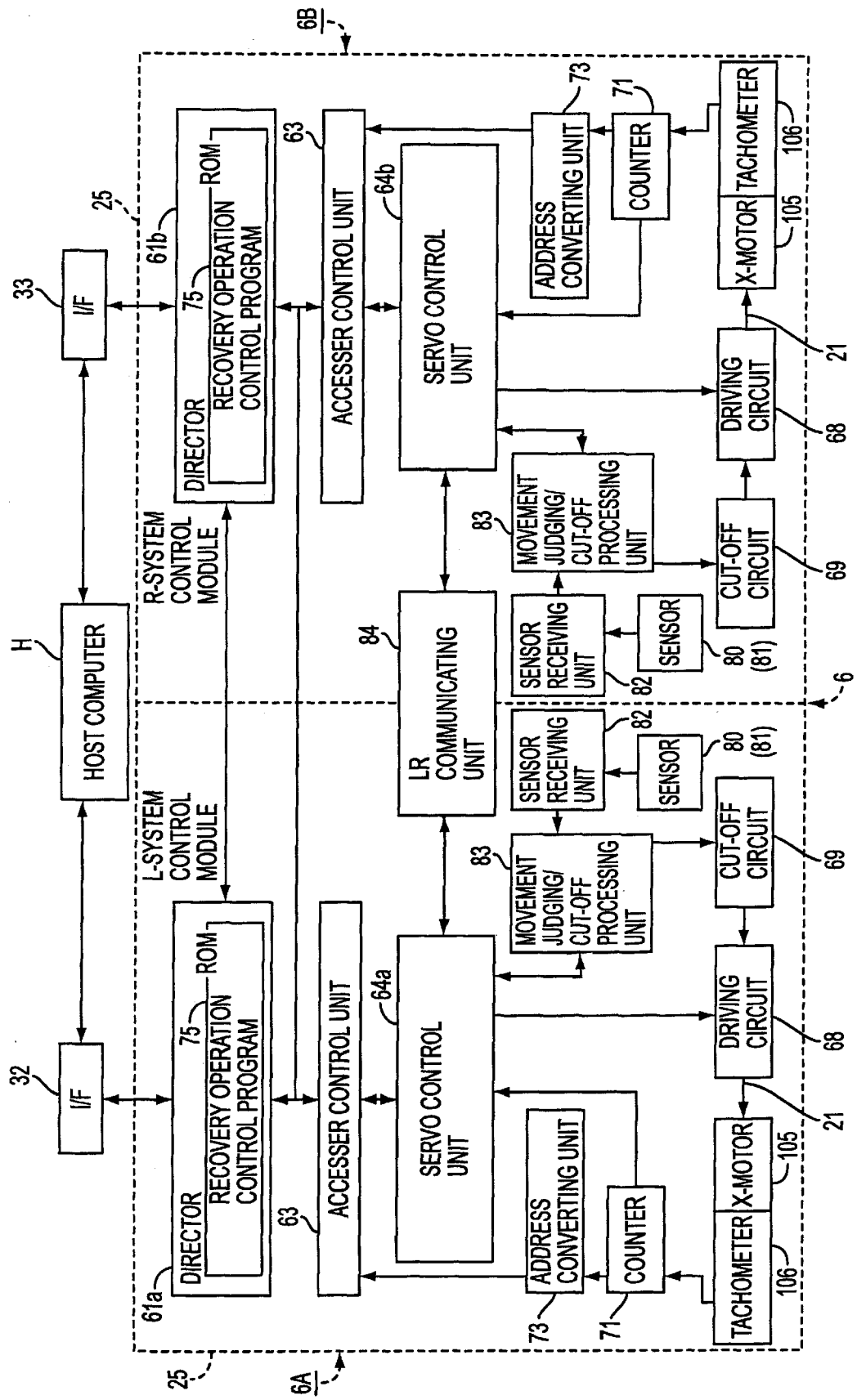
FIG. 14 is an diagram showing details of the control device in the embodiment 2.

Next, monitoring control of the accessor in the embodiment 2 will be explained. FIG. 14 is an explanatory diagram showing in detail a control module 6. Referring to FIG. 14, the control module 6 in the embodiment 2 is different from the control module 6 (see FIG. 6) in the embodiment 1 in terms of the following points.

Namely, the components removed therefrom are the register 65, the servo monitoring control unit 66 and the second counter 72 in the control module 6 (the L-and R-system control modules 6a, 6b), which are shown in the embodiment 1. On the other hand, the control module 6 (the L- and R-system control modules 6a, 6b) in the embodiment 2 is provided with the sensors 80, 81, a sensor receiving unit 82, a movement judging/cut-off processing unit 83 and an LR communicating unit 84. The sensors 80, 81, the sensor receiving unit 82, the movement judging/cut-off processing unit 83 and the cut-off circuit 69 are actually mounted in the respective accessors AL, AR (see FIG. 16).

Figure 13:
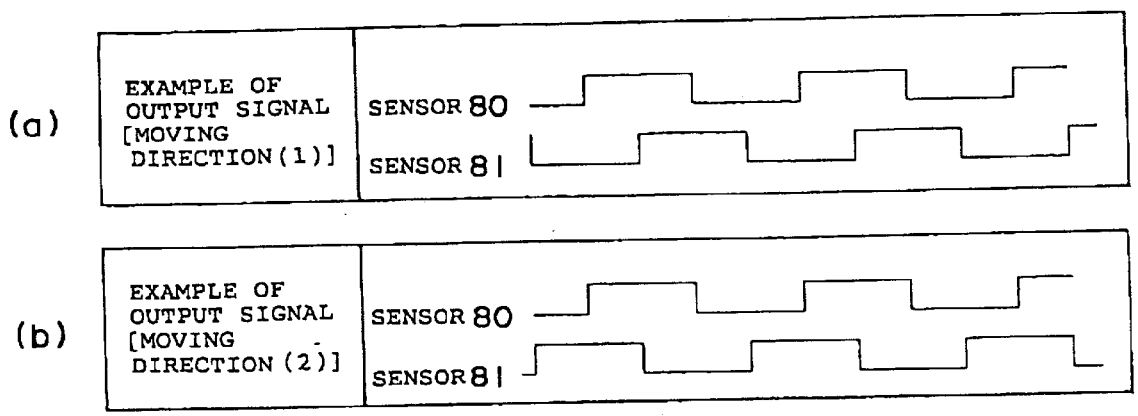
FIG. 13 is a diagram showing examples of an output signal of the sensor shown in FIG. 12.

Herein, the sensor receiving unit 82, which is defined as an output receiving circuit of each of the sensors 80, 81, generates output signals shown in FIG. 13 from outputs of the sensors 80, 81, and supplies the movement judging/cut-off processing unit 83 with these signals.

The LR communicating unit 84 intervenes between the servo control unit 64a and the servo control unit 64b and controls an information exchange process therebetween.

The servo control unit 64a (the servo control unit 64b) in the embodiment 2 is a classified as a processor device constructed of an MPU and a memory device etc, and controls the drive of the X-motor 105. That is, the servo control unit 64a receives a relative moving quantity (containing the moving direction) of the accessor AL from the accessor control unit 63, and gives the driving circuit 68 a drive command of the X-motor 105 that is based on the above quantity.

Further, the servo control unit 64a supplies the movement/judging/cut-off processing unit 83 with a monitoring effective signal (by which to make executable a process by the movement judging/cut-off processing unit 83). Further, the servo control unit 64a obtains an operation mode (stop mode/traveling mode) of the accessor AL from the accessor AL relative moving quantity received from the accessor control unit 63, and supplies the movement judging/cut-off processing unit 83 with this operation mode.

Moreover, the servo control unit 64a is connected to the counter 71, and receives the number of rotations of the X-motor 105 that is detected by the tachometer circuit 106. In this case, the servo control unit 64a calculates the moving quantity (containing the moving direction) of the accessor AL from the number of rotations of the X-motor 105.

At this time, the servo control unit 64a, if the operation mode of which to inform the movement judging/cut-off processing unit 83 is the stop mode, obtains a movement allowable range of the accessor AL from the moving quantity of the accessor AL, and supplies the movement judging/cut-off processing unit 83 with this allowable range together with the moving quantity of the accessor AL. On the other hand, the servo control unit 64a, if the operation mode of which the movement judging/cut-off processing unit 83 is informed is the traveling mode, supplies the movement judging/cut-off processing unit 83 with the moving direction of the accessor AL together with the moving quantity thereof.

Further, the servo control unit 64a receives a notification of occurrence of an abnormality in the accessor AL from the movement judging/cut-off processing unit 83. In this case, the servo control unit 64a notifies the servo control unit 64b of the effect that the accessor AL is urgently stopped, through the LR communicating unit 84.

Moreover, the servo control unit 64a receives, via the LR communicating unit 84 from the servo control unit 64b, the notification purporting that the accessor AR is urgently stopped. In this case, the servo control unit 64a gives the driving circuit 69 a drive stop command of the X-motor 105.

The movement judging/cut-off processing unit 83 receives the output signals (pulse waves: see FIG. 13) of the sensors 80, 81 from the sensor receiving unit 82. At this time, the movement judging/cut-off processing unit 83 judges an operation (stopping in process, and traveling in process) of the accessor Al (the accessor AR) and a moving direction thereof, from waveforms of the output signals received from the sensor receiving unit 82. Then, the movement judging/cut-off processing unit 83 judges whether or not the operation of the accessor AL becomes abnormal by use of a result of the above judgement.

Herein, the movement judging/cut-off processing unit 83 retains data (data about the moving quantity of the accessor AL, which corresponds to one gear tooth of the rack 202) about a length corresponding to one cycle of the pulse wave received from the sensor receiving unit 82. The movement judging/cut-off processing unit 83 counts the number of pulses received from the sensor receiving unit 82, and calculates the moving quantity of the accessor AL from the obtained number of pulses (which correspond to a second position detecting device).

Subsequently, the movement judging/cut-off processing unit 83 compares the calculated moving quantity of the accessor AL with the accessor AL moving quantity received from the servo control unit 64a. The movement judging/cut-off processing unit 83, if contradictory to each other (not coincident with each other within a predetermined allowable range), deems that a value error occurs in the counter 71 because of faults caused in the X-motor 105 and the tachometer circuit 106 etc, and therefore urgently stops the accessor AL.

Note that the number of pulses counted by the movement judging/cut-off processing unit 83 of the L-system control module 6a is set to "0" just when the accessor AL is in the home position. The number of pulses increases when the accessor AL travels toward the garage unit R1 but decreases when traveling toward the garage unit L1. On the other hand, the number of pulses counted by the movement judging/cut-off processing unit 83 of the R-system control module 6b is set to "0" just when the accessor AR is in the home position. The number of pulses increases when the accessor AR travels toward the garage unit L1 but decreases when traveling toward the garage unit R1.

Figure 15:
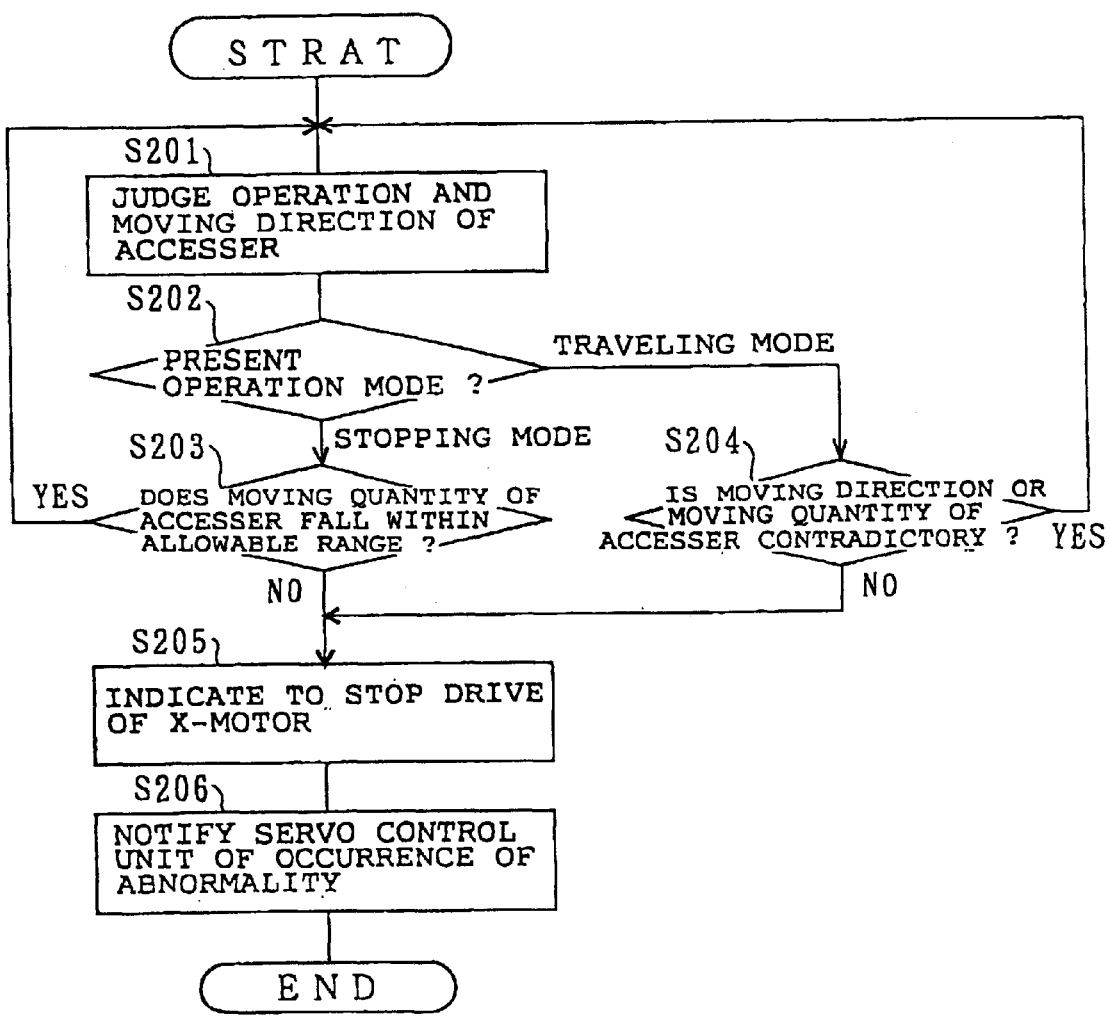
FIG. 15 is a flowchart showing processes of a movement judging/cut-off processing unit shown in FIG. 14.

FIG. 15 is a flowchart showing an example of processing by the movement judging/cut-off processing unit 83. In the example shown in FIG. 15, the processes are started by the movement judging/cut-off processing unit 83 receiving the monitoring effective signal. Herein, the processes by the movement judging/cut-off processing unit 83 of the L-system control module 6a, are explained by way of an example. Further, on the occasion of this processing, information on the operation mode is supplied to the movement judging/cut-off processing unit 83 from the servo control unit 64a. In addition, the servo control unit 64a supplies the moving quantity of the accessor AL to the movement judging/cut-off processing unit 83.

To begin with, the movement judging/cut-off processing unit 83 receives the output signals of the sensors 80, 81 from the sensor receiving unit 82, and judges, by the above-described method, the moving quantity and the moving direction of the accessor AL through the sensors 80, 81 (step S201).

Subsequently, the movement judging/cut-off processing unit 83 whether the present operation mode is defined as the stopping mode or the traveling mode on the basis of the operation mode information received from the present servo control unit 64a (step S202). At this time, if the present operation mode is the stopping mode, the processing proceeds to step S203 and, if defined as the traveling mode, proceeds to step S204.

The movement judging/cut-off processing unit 83, when making the processing proceed to step S203, judges whether or not the accessor AL moving quantity obtained in step S201 falls within the accessor AL movement allowable range received from the servo control unit 64a. At this time, if the moving quantity falls within the allowable range (step S203; YES), it is deemed that the accessor AL normally operates (which remains stopped), and the processing returns to step S201. Whereas if over the allowable range (step S203; NO), it is deemed that the operation of the accessor AL is abnormal (which continues to move instead of the stopping mode), and the processing proceeds to step S205.

On the other hand, the movement judging/cut-off processing unit 83, when making the processing proceed to step S204, judges whether or not the accessor AL moving direction and moving quantity obtained in step S201 are contradictory to the moving direction and moving quantity received from the servo control unit 64a. At this time, if the moving directions and the moving quantities are not contradictory t each other (step S204; YES), the movement judging/cut-off processing unit 83 judges that the accessor AL normally operates, and returns the processing to step S201. Whereas if contradictory to each other (step S204; NO), a judgement is that the operation of the accessor AL is abnormal, and the processing proceeds to step S205.

The movement judging/cut-off processing unit 83, when making the processing proceed to step S204, gives the cut-off circuit 69 a drive stop indication of the X-motor 105 of the accessor AL. Then, the movement judging/cut-off processing unit 83 notifies the servo control unit 64a of an occurrence of abnormality of the accessor AL (step S206), and its own processes terminate.

Example of Operation of Library Apparatus

Figure 16:
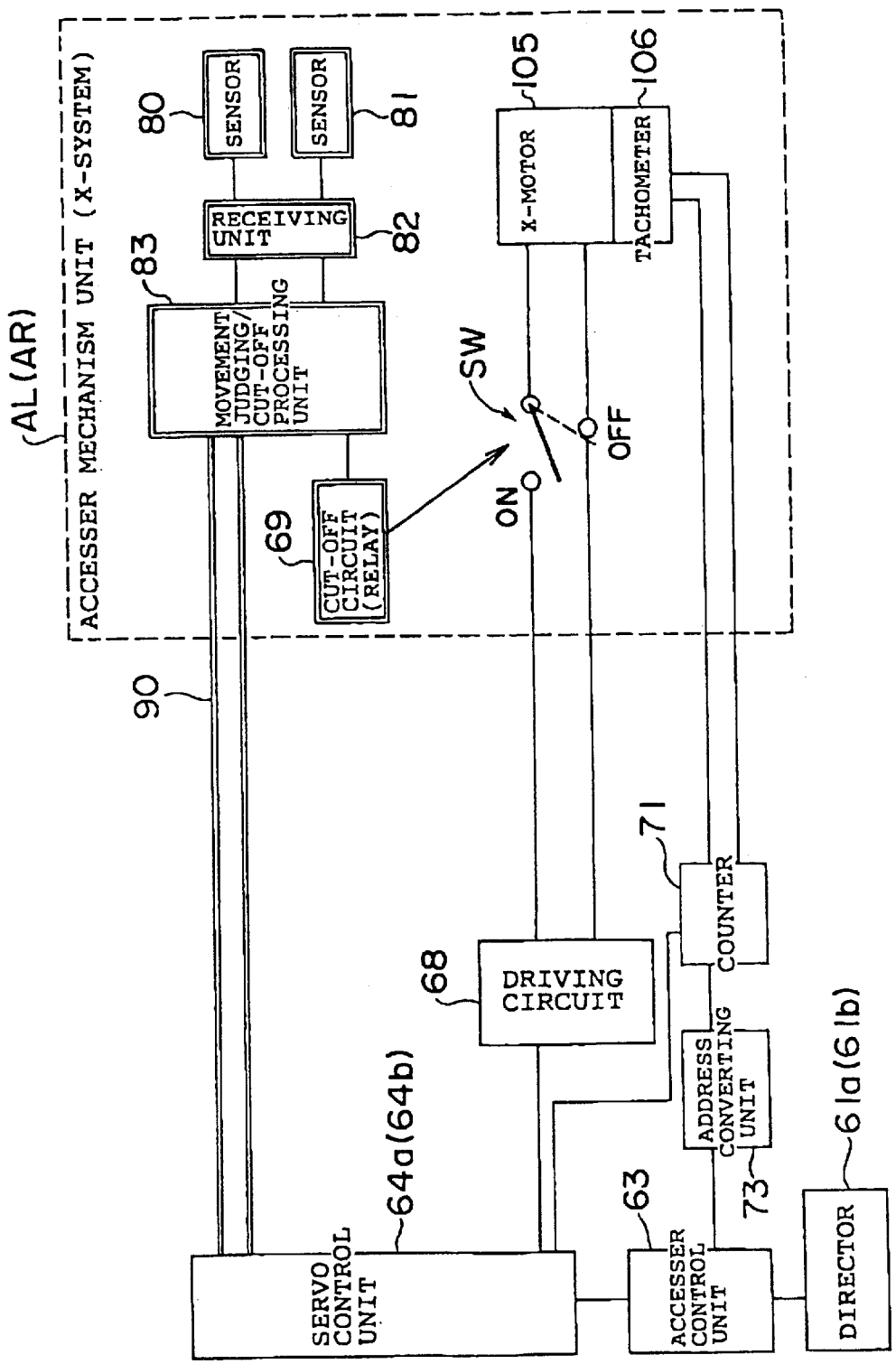
FIG. 16 is an explanatory diagram, of operations in the embodiment 2.

Next, an operational example of the library apparatus 100 in the embodiment 2 will be described with reference to FIGS. 14–16. FIG. 16 is an explanatory diagram showing a monitoring operation of the accessor AL in the embodiment 2. FIG. 16, however, shows only the L-system control module 6a (the R-system control module 6b).

To begin with, a basic operation of the library apparatus 100 is discussed. Referring to FIG. 14, the respective directors 61a, 61b execute the scheduling about the operations of the accessors Al, AR on the basis of the command issued from the host computer H, and gives a moving command to the accessor control unit 63 subordinate to the directors themselves. The accessor control unit 63 gives the moving command of the accessor AL to the servo control unit 64a on the basis of the moving command received from the director 61a. Thereupon, the servo control unit 64a issues the drive command of the X-motor 105 to the driving circuit 68 on the basis of the moving command. The driving circuit 68, upon receiving the drive command of the X-motor 105, supplies the X-motor 105 with the driving electric power corresponding to the drive command.

The X-motor 105 is thereby actuated, and the driving shaft 105a and the pinion 203 (see FIG. 11). then, the gear teeth of the pinion 203 mesh with the gear teeth of the rack 202, whereby the accessor AL travels along an X-rail 201. At this time, the number of rotations of the X-motor 105 is detected by the tachometer circuit 106 and stored in the counter 71. Thereupon, the address converting unit 73 calculates the absolute position (the present position) of the accessor AL from a content of the storage in the counter 71, and supplies the calculated position to the accessor control unit 63. Then, the accessor control unit 63 gives the servo control unit 64a a moving command based on the absolute position of the accessor AL. Thus, the basic operation of the accessor AL is controlled.

Next, the monitoring operation of each of the accessors AL, AR in the embodiment 2 will be described. Herein, the operation of the L-system control module 6a is chiefly explained by way of an example. Referring to FIG. 16, the servo control unit 64a in process of the basic operation described above, when giving the drive command to the driving circuit 68, supplies the movement judging/cut-off processing unit 83 with the monitoring effective signal and the operation mode information via a signal line 90. Thereafter, the servo control unit 64a supplies the movement judging/cut-off processing unit 83 with the moving quantity (the movement allowable range, and the moving direction) of the accessor AL whenever necessary.

The movement judging/cut-off processing unit 83, by its receiving the monitoring effective signal, come into a status of accepting the output signal from the sensor receiving unit 82. Then, the movement judging/cut-off processing unit 83 judges the moving quantity and the moving direction of the accessor AL on the basis of the output signal received from the sensor receiving unit 82 (step S201).

Subsequently, the movement judging/cut-off processing unit 83 judges the operation mode at a point of the present time. In this case, if the operation mode at the present time, the movement judging/cut-off processing unit 83 judges whether or not the accessor AL moving quantity obtained by the processing unit 83 itself falls within the movement allowable range (step S203). On the other hand, the movement judging/cut-off processing unit 83, if the operation mode at the present mode is the traveling mode, judges whether or not the accessor AL moving direction obtained by the processing unit 83 itself is contradictory to the moving direction received from the servo control unit 64 (step S204).

Then, if the moving quantity exceeds the allowable range, or if the moving direction is contradictory thereto, the movement judging/cut-off processing unit 83 assumes that the operation of the accessor AL is abnormal and therefore gives the drive stop indication of the X-motor 105 to the cut-off circuit (relay) 69 (step S205). Thereupon the cut-off circuit 69 turns OFF the switch SW, thereby stopping the supply of the electric power to the X-motor 105 from the driving circuit 68. Simultaneously with this processing, the cut-off circuit 69 effects short-circuiting between the two terminals of the X-motor 105 (see FIG. 16). The drive of the X-motor 105 is thereby stopped, and abrupt damping is applied to the accessor AL, with the result that the accessor AL urgently stops.

Thereafter, the movement judging/cut-off processing unit 83 notifies the servo control unit 64a of the occurrence of abnormality in the accessor AL (step S206). The servo control unit 64a imparts this notification of the abnormality occurrence to the LR communicating unit 84 (see FIG. 14). The LR communicating unit 84 transfers the notification of the abnormality occurrence to the servo control unit 64b. Then, the servo control unit 64b gives the drive stop command of the X-motor 105 to the driving circuit 68. Owing to this command, the supply of the electricity to the X-motor 105 from the driving circuit is stopped, thereby stopping the accessor AR. As described above, the accessor AL stops in emergency, in which case the accessor AR also stops. The security of the library apparatus 100 is thereby enhanced.

Thereafter, each of the servo control units 64a, 64b notifies the accessor control unit 63 of the purport that the accessor AL or AR is stopped in emergency. The accessor control unit 63 informs each of the directors 61a, 61b of the emergency stoppage. Thereupon, each of the directors 61a, 61b executes the recovery process (see FIG. 10) of the library apparatus 100, which has been explained in the embodiment 1. With this processing, the accessors AL, AR move up to such positions that the library apparatus 100 becomes capable of resuming the operation, and thereafter the library apparats 100 resumes the operation by use of only the usable accessor.

Effect of Embodiment 2

The library apparatus 100 in the embodiment 2 includes a second accessor position detecting mechanism (corresponding to a second monitoring device and a second position detecting device) constructed of the sensors 80, 81, the sensor receiving unit 82 and the movement judging/cut-off processing unit 83 separately from the first accessor position detecting mechanism (corresponding to the first position detecting device) constructed of the tachometer circuit 106, the counter 71 and the servo control unit 64*a* (the servo control unit 64*b*).

The second accessor position detecting mechanism obtains the moving quantity of the accessor independently of the first accessor position detecting mechanism. Then, the movement judging/cut-off processing unit 83 compares the accessor moving quantity obtained by the first accessor position detecting mechanism with the accessor moving quantity obtained by the second accessor position detecting mechanism. If the two quantities are contradictory to each other, the same processing unit 83 deems that the abnormality (fault) occurs in the accessor Al (the accessor AR), and therefore stops the traveling thereof.

Thus, according to the embodiment 2, if the error is caused in the accessor moving quantity obtained by the first accessor position detecting mechanism due to the fault etc of the tachometer circuit 106, the accessors AL, AR stop urgently. It is therefore feasible to prevent the accessors AL, AR from colliding with each other or abnormally approaching each other due to the fault in the tachometer circuit 106 etc.

Further, the sensors 80, 81 are provided with deviations in the installing positions with respect to the pitches of the gear teeth of the rack 202, and hence the second accessor position detecting mechanism is capable of detecting also the moving direction of each of the accessors AL, AR. Therefore, even if the moving directions or the moving quantities of the accessors AL, AR are contradictory to each other, the accessors AL, AR urgently stop, thereby preventing the collision and abnormal approaching thereof.

Further, according to the embodiment 2, there are no physical contact points between the sensors 80, 81 serving as the position detecting mechanism for preventing the collision and the X-motor 105 serving as the accessor moving mechanism. Hence, the position detecting error is harder to occur due to the slippage and the deviation than by the position detecting mechanism using the tachometer circuit 106. Accordingly, the position detecting mechanism based on the sensors 80, 81, i.e., the second position detecting mechanism is much harder to receive an influence by disturbance than by the first position detecting mechanism.

If optical sensors (an optical system position detecting mechanism are used as the sensors 80, 81, the accuracy is inferior (a minimum resolution of the former is approximately 2 mm, while the minimum resolution of the latter is approximately 0.05 mm) to the position detecting mechanism(a mechanical system position detecting mechanism) using the tachometer circuit 106. Therefore, the optical system position detecting mechanism is not suitable for use as the position detecting mechanism for implementing subtle positional control. namely, the optical system position detecting mechanism is unusable as the accessor driving system position detecting mechanism. As a matter of course, however, the optical system position detecting mechanism is, if used for preventing the collision and the abnormal approaching, capable of sufficiently attaining the object of the present invention.

Moreover, according to the embodiment 2, the sensors 80, 81 as the position detecting mechanism for preventing the collision are spaced a distance from the X-motor 105 as the accessor moving mechanism. Hence, the two mechanisms are hard to receive the influence (e.g., damages to the two mechanism, which are caused by the same falling object) by the same disturbance. Accordingly, in accordance with the embodiment 2, the reliability about an avoidance of the collision and abnormal approaching between the accessors is more enhanced than in the embodiment 1.

Note that the construction of the embodiment 2 can be combined with the construction of the embodiment 1. In this case, the reliability about avoiding the collision and abnormal approaching between the accessors can be further enhanced.

It is apparent that, in this invention, a wide range of different working modes can be formed based on the invention without deviating from the spirit and scope of the invention. This invention is not restricted by its specific working modes except being limited by the appended claims.

What is claimed is:

1. A control device for a library apparatus having one traveling path along which a plurality of housing units housing recording media are disposed on at least one side thereof, a plurality of carrying devices, each moving on said traveling path, carrying the recording media between said housing units and a determining unit determining an operation of each of said carrying devices so that said carrying devices do not collide with each other, comprising:
    a movement controller corresponding to one of said plurality of carrying devices, moving one carrying device on the basis of a result of the determination made by said determining unit;
    a first position detector detecting a moving quantity when said one carrying device is moved by said movement controller;
    a second position detector detecting another moving quantity of said one carrying device separately from said first position detector when the moving quantity of said one carrying device is detected by said first position detector; and
    a stopper for comparing a result of the detection by said first position detector with a result of the detection by said second position detector and, if the results are not coincident with each other, stopping the movement of said one carrying device.

2. The control device according to claim 1, wherein said first position detector and said second position detector further respectively detect moving directions of said one carrying device, and
    said stopper stops said one carrying device if the moving direction detected by said first position detector is not coincident with the moving direction detected by said second position detector.

3. The control device according to claim 1, further comprising:
    a rack forming said traveling path said rack having a plurality of gear teeth provided in a moving direction of each of said carrying devices,
    a plurality of pinions rotating while meshing gear teeth of said rack,
    a motor rotating said pinions,
    a driving circuit supplying electric power to said motor,
    a tachometer detecting a quantity of rotations of said motor
    a first calculating unit calculating a moving quantity of said one carrying device on the basis of an output signal of said tachometer, a sensor provided on said one carrying device and being movable in a straight line in a face-to-face relationship with said rack and detecting the gear teeth of said rack bearing such a positional relationship so as to face to said sensor, and a second calculating unit calculating the moving quantity from a number of gear teeth of said rack detected by said sensor.

4. The control device according to claim 3, wherein said stopper cuts off the electric power provided to said motor from said driving circuit and abruptly damps said one carrying device by short-circuiting terminals of said motor.

5. The control device according to claim 3, wherein said sensor comprises a first and a second sensor disposed with a deviation in relative positions with respect to the gear teeth of said rack in the moving direction along said traveling path of said one carrying device.

6. A library apparatus comprising:

a traveling path along which a plurality of housing units for housing recording media are disposed on at least one side thereof;

a plurality of carrying devices, each moving on said traveling path, carrying the recording media between said housing units;

a determining unit determining an operation of each of said carrying devices so that said carrying devices do not collide;

a movement controller provided corresponding to one of said plurality of carrying devices and moving said one carrying device based on a result of the determination made by said determining unit;

a first position detector detecting a moving quantity when said one carrying device is moved by said movement controller;

a second position detector detecting the moving quantity of said one carrying device separately from said first position detector when the moving quantity of said one carrying device is detected by said first position detector; and a stopper comparing a result of the detection by said first position detector with a result of the detection by said second position detector and, if the results are not coincident, stopping the movement of said one carrying device.

\* \* \* \* \*